United States Patent [19]

Shalon

[11] 4,394,740
[45] Jul. 19, 1983

[54] COMPUTER ADAPTED APPARATUS AND METHOD FOR PRICING LENGTHS OF MATERIAL

[75] Inventor: Tadmor Shalon, St. Louis, Mo.

[73] Assignee: The Measuregraph Company, St. Louis, Mo.

[21] Appl. No.: 244,268

[22] Filed: Mar. 16, 1981

[51] Int. Cl.³ .................... G06F 15/20; G01B 3/12
[52] U.S. Cl. ................................. 364/464; 33/133; 377/24; 364/562
[58] Field of Search ............ 364/464, 470, 475, 562; 235/92 DN, 92 EV, 92 V; 33/127, 129, 133

[56] References Cited

U.S. PATENT DOCUMENTS 3,916,174 10/1975 Moule .................................. 364/562
4,039,805 8/1977 Newell ............................... 364/464

Primary Examiner—Errol A. Krass
Attorney, Agent, or Firm—B. B. Olive

[57] ABSTRACT

Apparatus and method for measuring unit or remnant lengths of material, calculating the price and developing related sales information adapts to use in a system wherein the measuring and related data entry operations are performed at a plurality of terminals connected to a central computer. Each terminal employs a measuring roller and associated optical-electronic measuring and data processing circuitry. The measuring roller moves bi-directionally to increment or decrement the measure and is adapted for being repositioned to a precise home position at the commencement of each measuring operation. Electronic "noise" encountered with prior art optical-electronic length measuring and price computation apparatus has been substantially eliminated and operation improved by use of visual and audio cues for the operator.

14 Claims, 18 Drawing Figures

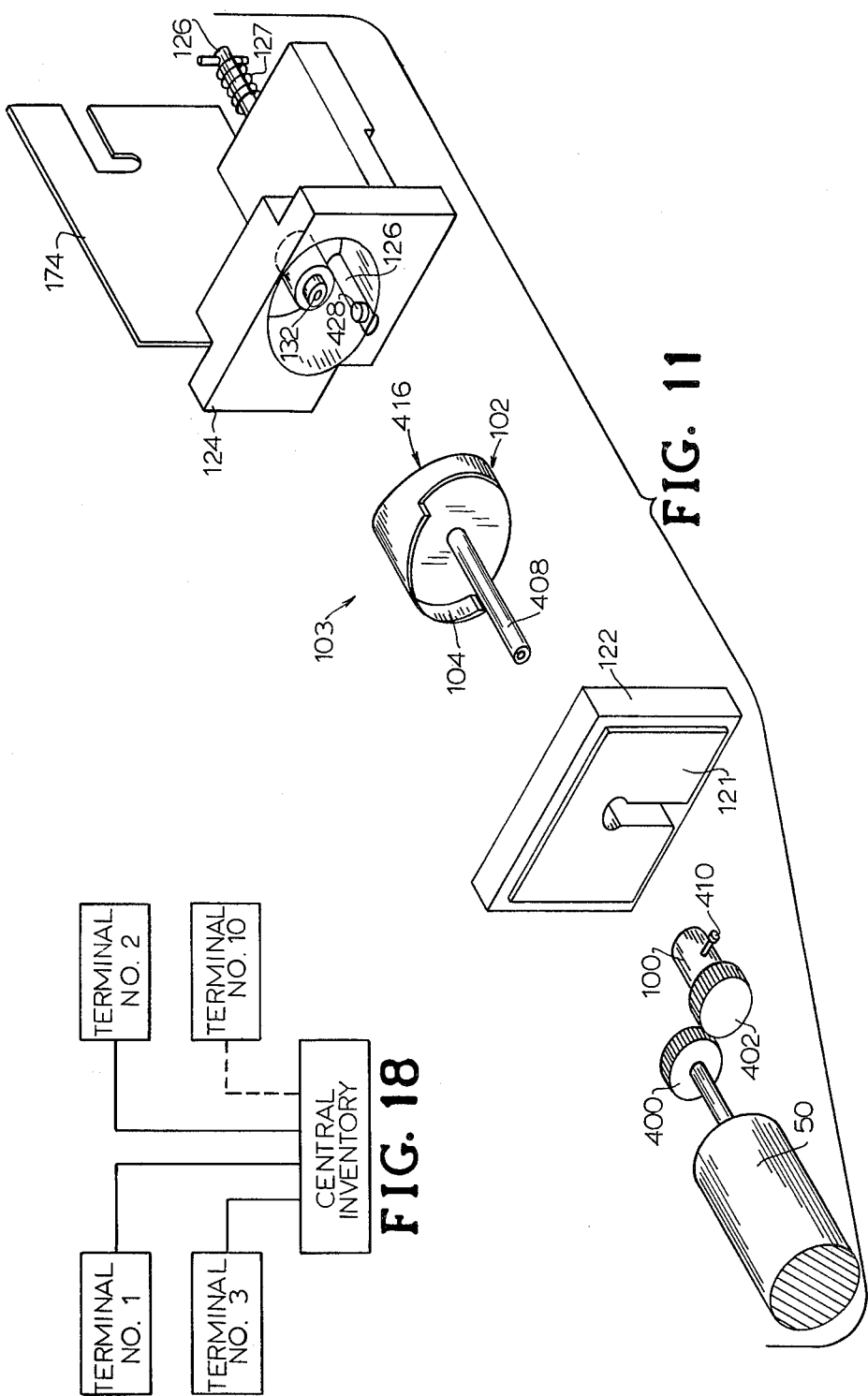

COMPUTER ADAPTED APPARATUS AND METHOD FOR PRICING LENGTHS OF MATERIAL

DESCRIPTION

1. Technical Field

The invention relates to a store terminal apparatus and method for developing price and other information related to measured lengths of material, e.g., fabric.

2. Background Art

It has been previously known, as for example, in U.S. Pat. No. 3,916,174 to provide an electronic apparatus for measuring lengths of material and computing the sales price. In such prior art electronic measuring and price computing apparatus, it has also been known to display the price information to the customer and operator and to provide means whereby the material, e.g., fabric, could be moved back and forth over a measuring roller to increment or decrement and display the measured length. In conjunction with such apparatus, it has also been known to provide means enabling the fabric to be notched at some measured length but only under the condition of the measuring roller being locked prior to notching. Various interrupted light devices driven by the measuring roller have been employed to develop the data necessary for calculating the measured length. Other aspects of prior art practices related to electronically calculating the price of measured lengths of material are to be found in U.S. Pat. No. 4,039,805.

It is also to be noted that even prior to the advent of the electronic measuring and price computing technology illustrated, for example, by U.S. Pat. Nos. 3,916,174 and 4,039,805, various mechanical-type fabric measuring and cost computing apparatus were found in the prior art as illustrated, for example, by U.S. Pat. No. 3,787,981. This last-mentioned patent teaches a measuring apparatus in which the fabric, as in U.S. Pat. Nos. 3,916,174 and 4,039,085, is drawn between a measuring roller and a pressure roller. However, the measured length and cost are arrived at by mechanical means. Various mechanical mechanisms have also been provided enabling the measuring roller to be brought to a zero or home start position and the pressure roller to be raised to permit entry and removal of the fabric in the throat of the measuring machine.

Since the present invention of an improved apparatus and method for measuring and pricing lengths of material embodies what is believed to be a unique and improved photo-optical measuring component and technique, mention is made of U.S. Pat. Nos. 3,692,988; 3,769,498; 3,912,926; 3,989,068; 4,051,913; 4,093,032; and 4,195,348 as being illustrative of the prior art optical encoders as related to a variety of measuring applications. Also, U.S. Pat. Nos. 4,195,138 is noted as combining an optical encoder with a microprocessor. However, as will appear from later description, the present invention employs a substantially difference type optical encoder, measures fabric and processes the optical data in a manner distinctly different from the manner in which data is processed in the circuitry of U.S. Pat. No. 4,195,138 for tape rule measurements.

While further discussion of the prior art could be made, it is believed that the mentioned prior art patents are sufficient and generally representative of the state of the art to enable the contributions of the present invention to be fully understood. With the foregoing discussion in mind, the following shortcomings, prior to the present invention, were noted as existing in what is believed to be the most advanced electronic-type apparatus and method for measuring and computing the cost of lengths of material:

(1) While adapted for measuring and costing at a single terminal, the prior art apparatus and methods are not adapted to provide a plurality of terminals at each of which measuring and costing information can be computed and from all of which terminals information can be fed to a central computer.

(2) The prior art measuring and pricing apparatus has not provided for entry of coded operator as well as inventory information.

(3) Provision has not been made in the prior art apparatus for being able to quickly restore the measuring roller as well as the associated optical encoder to a home position before commencing each measuring operation.

(4) The types of optical encoders driven by the measuring roller of the prior art apparatus in the more advanced electronic-type length measuring and price computing apparatus of the prior art have been inherently susceptible to external electrical noise and mechanical jitter resulting in erroneous counts. The prior art apparatus has also been subject to jitter during operator induced back and forth motions and particularly during rapid back and forth movements of the fabric on the measuring roller which has also resulted in erroneous counts.

(5) The retail store fabric measuring and price computation terminals of the prior art have not incorporated a processor controlled character forming and processor controlled driven thermal printer and specifically in the configuration of the present invention.

(6) No provision has been made in the prior art apparatus for providing the operator with either visual or audio cues to guide the operator in a step-by-step procedure with respect to data input, measuring and notching operations and including cue signals for wrong choices.

(7) The prior art apparatus of the more advanced electronic type and providing means suited to measuring and pricing lengths of fabric, and the like, have in general not provided a keyboard for data entry and more specifically have not provided a software scanned keyboard so as to facilitate operator control and produce operator information.

(8) The prior art apparatus has also not provided a single, always repeated, precise, "sense" and mechanical lock-out position for the measuring roller at the start and end of a unit measurement.

(9) A disadvantage, at least in some prior art material length measuring and pricing apparatus has arisen from the tendency of the measuring roller to cause stretch fabric to extend during the measuring operation because of relatively high drag on the fabric caused by spring loading of the roller thereby producing erroneous measurements and pricing information.

(10) Programmable options for metric and English measurements have been lacking in the prior art apparatus as well as the ability to deal with remnant sales at reduced prices.

(11) Aside from other shortcomings, the mechanical linkages within the prior art measuring apparatus and associated control level mechanisms have indicated a general need for improvement to facilitate operator speed, accurate measuring and relatively foolproof operation.

Thus, the general object of the present invention becomes that of overcoming the listed shortcomings of the prior art. Other objects and advantages of the invention will become apparent as the description proceeds.

Disclosure of Invention

The apparatus and method of the invention are adapted to employment in a system having a central computer linked to a plurality of terminals as, for example, in a retail store selling fabric. In such an environment, each terminal of the invention incorporates electromechanical means for measuring lengths of material, developing and printing out at the terminal and furnishing to the central computer sales information such as length measured, price, tax, operator code and inventory code.

With more specific reference to the apparatus and method of the invention as embodied in each terminal, there is provided an electromechanical measuring apparatus enabling a length of material to be measured by passing the same between measuring and pressure rollers with the apparatus being adapted to increment and decrement the measure according to direction of movement. Utilizing electronic computation and entry of unit cost, operator and inventory codes, the invention apparatus incorporates a thermal printer to print out all such information on a ticket at the terminal for presentation to the operator and customer at the conclusion of the sale. Also, various options including computing at a given tax rate and printing tax when tax is entered, computing and printing in either English or metric units, printing of a duplicate ticket, transmission to a central computer and execution of various operational tests are also incorporated in the invention apparatus.

An improved operator mechanism enables the measuring roller as well as an optical encode shield driven by the measuring roller to always be restored to a precise home position at the end and before the beginning of each measuring operation. More specifically, a notching lever, start lever and reset lever operate through various linkages such that notching of the fabric and start of a new measuring operation can be accomplished only when the measuring roller and the optical encoder which is driven by the measuring roller are both in a precise home position.

Improvements are also found in the specific optical encoder driven by the measuring roller of the invention in that an arcuate shield provides shielding of two optical detectors in an arcuate movement of slightly less than 10°. Thus, notching can be accomplished in a range of limited movement, e.g., ten degrees, thereby allowing the operator more rapid operation without substantial sacrifice of accuracy in measurement. Employment of a double-sloped cam mechanically connected to the optical shield allows quick resetting of the components to the home position. Of special significance is the fact that the particular optical encoder arrangement in conjunction with the signal processing circuitry essentially insures the absence of electronic noise or mechanically induced noise in the output data.

Other features of the invention circuitry include providing both audio and visual signals to cue the operator on a step-by-step basis and to advise the operator each time a notching operation can be achieved as well as when wrong data entry choices are made.

From the foregoing, there now follows a more detailed description from which other improvements over the prior art will become apparent.

DESCRIPTION OF THE DRAWINGS

FIG. 11 is an exploded pictorial view of portions of the mechanical drive assembly of the apparatus.

FIG. 18 is a block diagram of an inventory control system utilizing multiple fabric point-of-sale terminals.

DETAIL DESCRIPTION OF THE INVENTION

Figure 1:
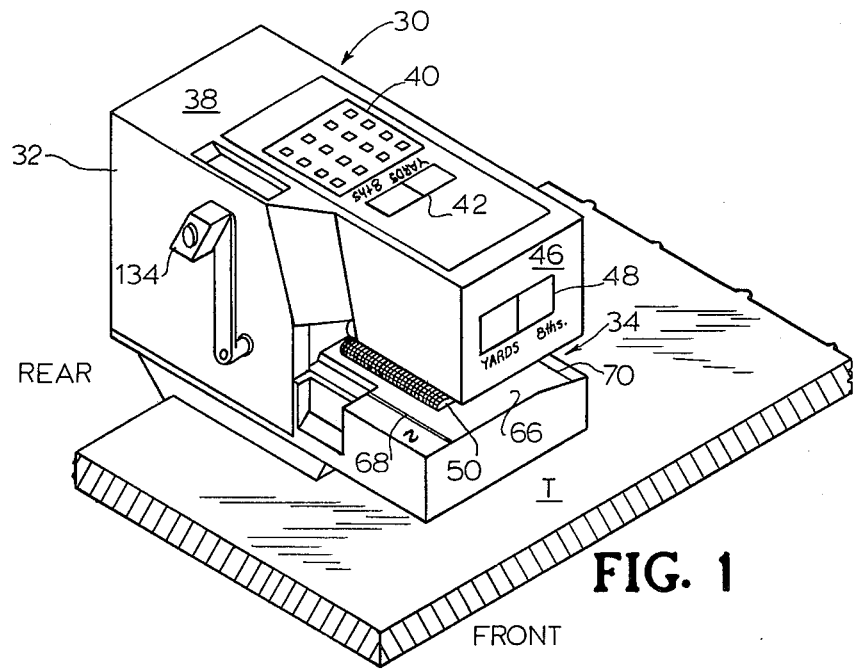
FIG. 1 is a pictorial front view of the fabric point-of-sale terminal in the instant invention showing both the customer and operator displays.
Figure 2:
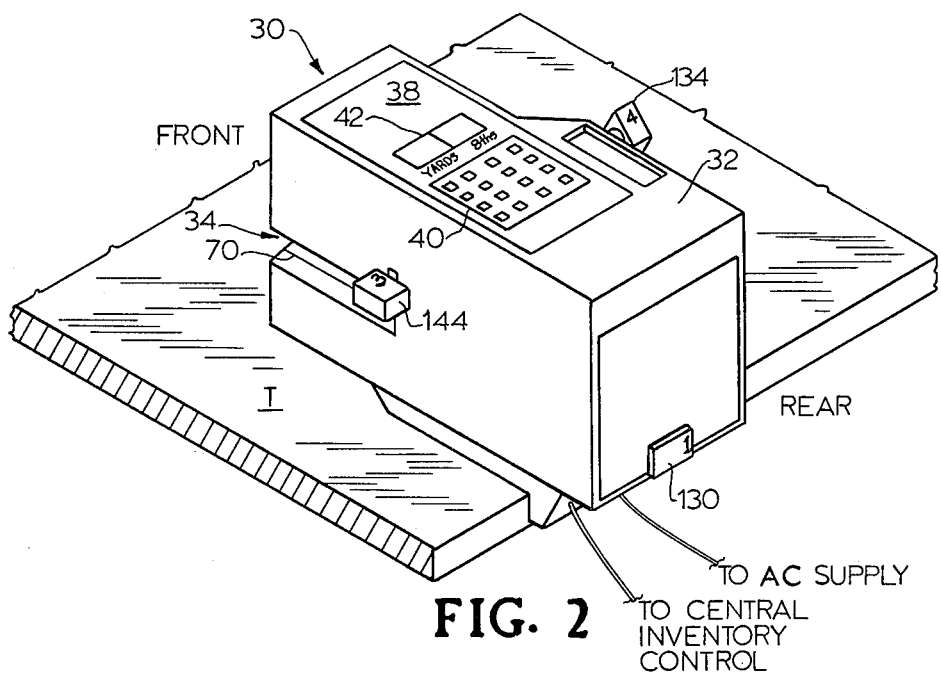
FIG. 2 is a pictorial view of the terminal shown in FIG. 1 taken from the rear thereof.

Referring now to the drawings, and first to FIGS. 1 and 2, the microprocessor controlled fabric point-of-sale terminal 30 of the present invention includes a substantially box-shaped cover or housing 32 providing a throat area 34 through which the desired length of material, for example, textile fabric, may be inserted for measurement. Since the manner of handling the fabric in the throat area 34 during measurement is essentially the same as that with prior art apparatus, no further details in this regard are deemed necessary. Terminal 30 includes a top operator control surface 38 providing an operator keyboard 40 and operator digital display 42. The front surface 46 of housing 32, as seen in FIG. 1, provides a customer digital display 48. Display 48 is a "shared" display adapted to display both length and price to the customer. The lower portion of terminal 30 includes means for securing the terminal to a table T by any suitable means, for example, by an undercarriage and thumbscrew arrangement.

Terminal 30 further includes a measuring roller 50 mounted for rotation on a horizontal axis below throat 34 and an opposed pressure roller 52 (FIG. 5) mounted for rotation above the measuring roller and being movable between a raised, retracted position in which the pressure roller is clear of the measuring roller and a down, contacting position in which the pressure roller is resiliently held against the measuring roller for gripping the fabric. When in the grippnig mode, the rollers are caused to rotate without slippage as the fabric is drawn between them.

During the measuring operation, the operator manipulates keyboard 40 to achieve any of several functions, namely: (a) establish calculator mode; (b) enter operator code; (c) correct an error entry; (d) enter inventory code; (e) enter unit price; (f) enter remnant purchase option; (g) enter end of a measurement; and (h) advance a blank paper. In addition to the manipulation of keyboard 40, the operator is also required to, as needed, manipulate three control levers, namely, (a) the reset lever 130 which is used to reset the measuring roller 50 and the driven optical encoder 103 to a precise home position; (b) the notch lever 134 which is used to raise the pressure roller 52, lock the measuring roller 50 in its home position and notch the fabric; and (c) the start lever 144 which is used to release the pressure roller 52 from its raised position and to unlock the measuring roller 50 from the home position. Operator assistance to insure correct operation of keyboard 40 and control levers 130, 134 and 144 is provided by visual cues in the nature of signal lights and audible cues when appropriate steps or positions are achieved. Thus, as will be better understood from later description, the invention terminal 30 provides a marked advance in the art with respect to the ease of operator use and training of unskilled operators.

Another basic feature of the invention to be recognized to facilitate the later more detailed description concerns the availability of a number of programmable options by use of microprocessor control in terminal 30. Such options include the following: (a) tax rate when tax is entered; (b) metric-English option, the selection of which controls corresponding counting, computing and display formats; (c) automatic printing of a second, duplicate ticket with vital transaction information; (d) entry of inventory code number; (e) entry of sales person number; (f) transmit to central computer which when enabled permits transmission of vital transaction information to a central computer as illustrated in FIG. 18 with each terminal having an assigned terminal number, e.g., 0-9; (g) transmit tests which when enabled presets the assigned terminal number to 0 and exercises the communication link for test purposes; and (h) self tests which when enabled causes terminal 30 to check its displays and printer. Thus, other advantages are obtained in terminal 30 by reason of the available programmable options.

Figure 3:
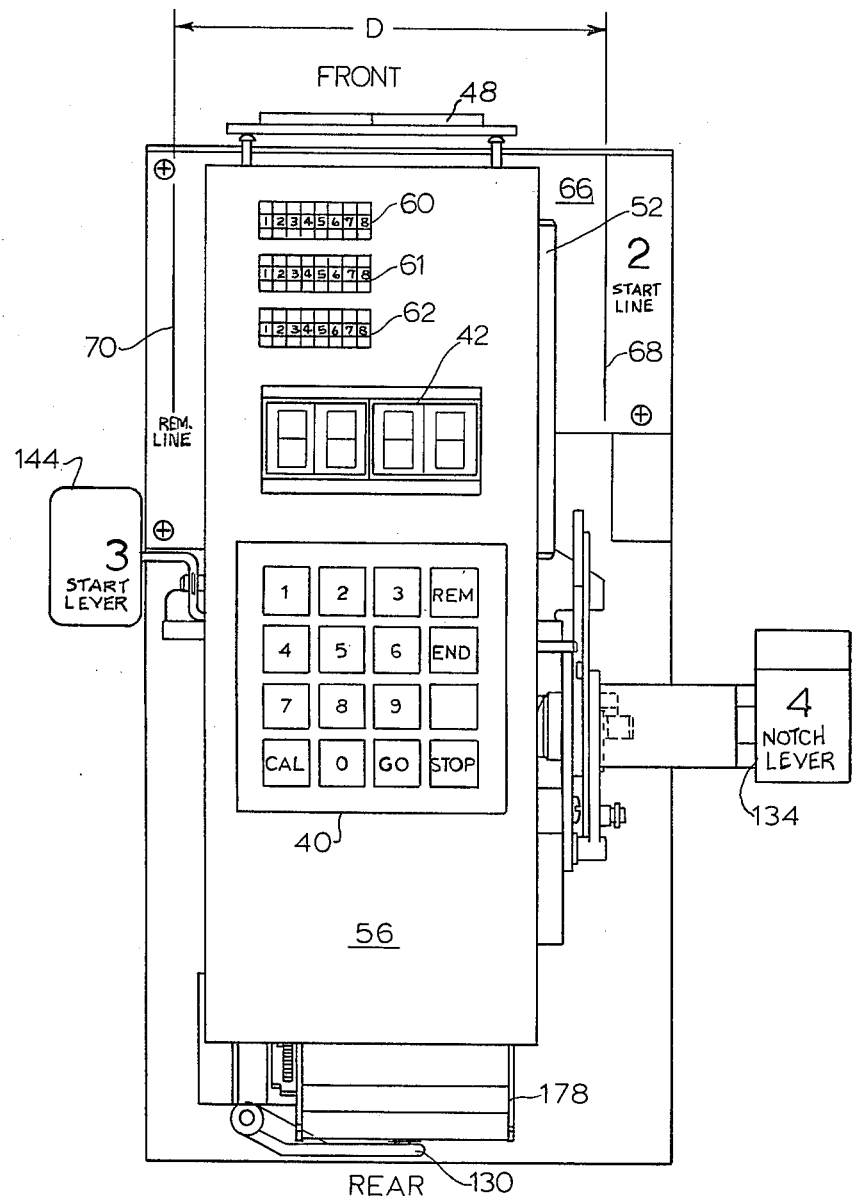
FIG. 3 is a top view of the terminal illustrated in FIGS. 1 and 2 with the cover removed for purposes of illustration and showing relative location of electronic elements.

Referring more specifically to the mechanical and electronic construction, it will be noted that FIG. 3 shows the top of terminal 30 with only the cover removed. Operator digital display 42 and keyboard 40 are mounted on an upper circuit board 56 which runs substantially the length of terminal 30. For reference purposes, the "front" or "forward" end of terminal 30 will be viewed in FIG. 1 and the "rear" or "rearward" end will be as viewed in FIG. 2. With this reference in mind, customer digital display 48 is mounted forward of circuit board 56. Circuit board 56 also mounts banks of DIP switches for selection of the previously-mentioned options with three such banks being designated at 60, 61 and 62 in FIG. 3 and serving as mechanical memory.

Figure 5:
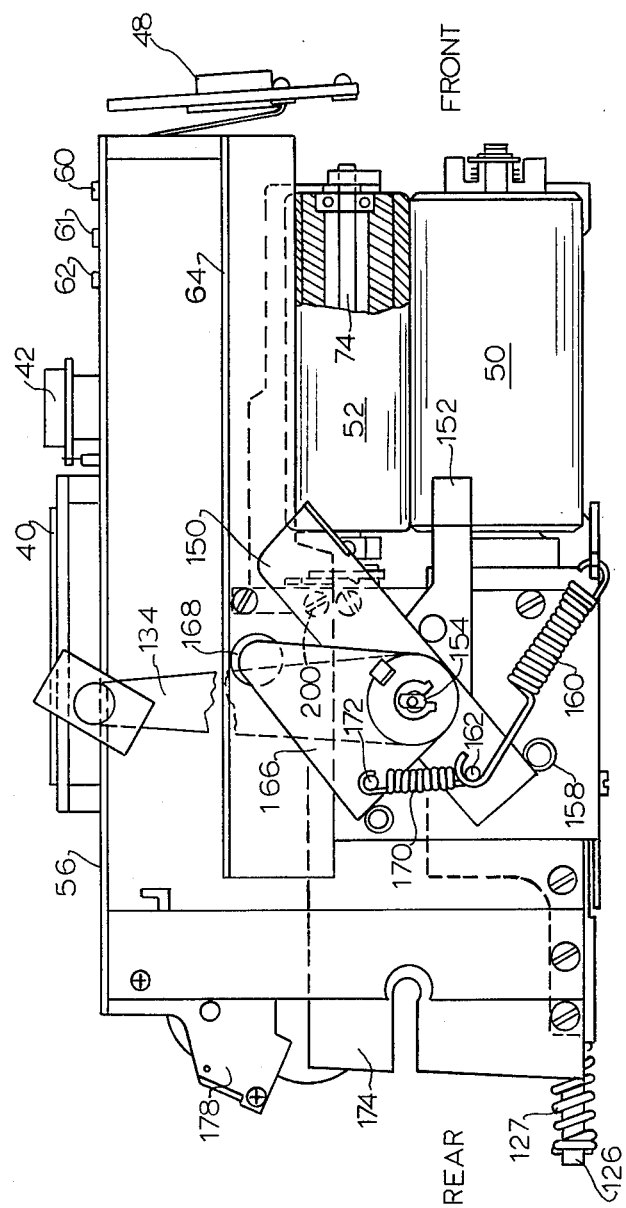
FIG. 5 is a side view of the terminal with the cover and selected parts removed and with portions of other parts broken away for purposes of illustration and showing relative location without details of other electronic elements.

As shown in FIG. 5, a second circuit board 64 is positioned below and substantially parallel to circuit board 56. While the details of circuit boards 56 and 64 are not illustrated, it will be understood that both circuit boards are employed to support these electronic components (FIGS. 13–14) associated with the circuitry of terminal 30.

A plate 66 defines the lower limit of throat 34 and includes a start line 68 at which the leading end of a length of material to be measured is placed. Also, a remnant line 70, used in measuring remnants is provided on plate 66 and the distance D between line 68 and line 70 is taken into account in the programmed computation when remnants are being measured.

Figure 4:
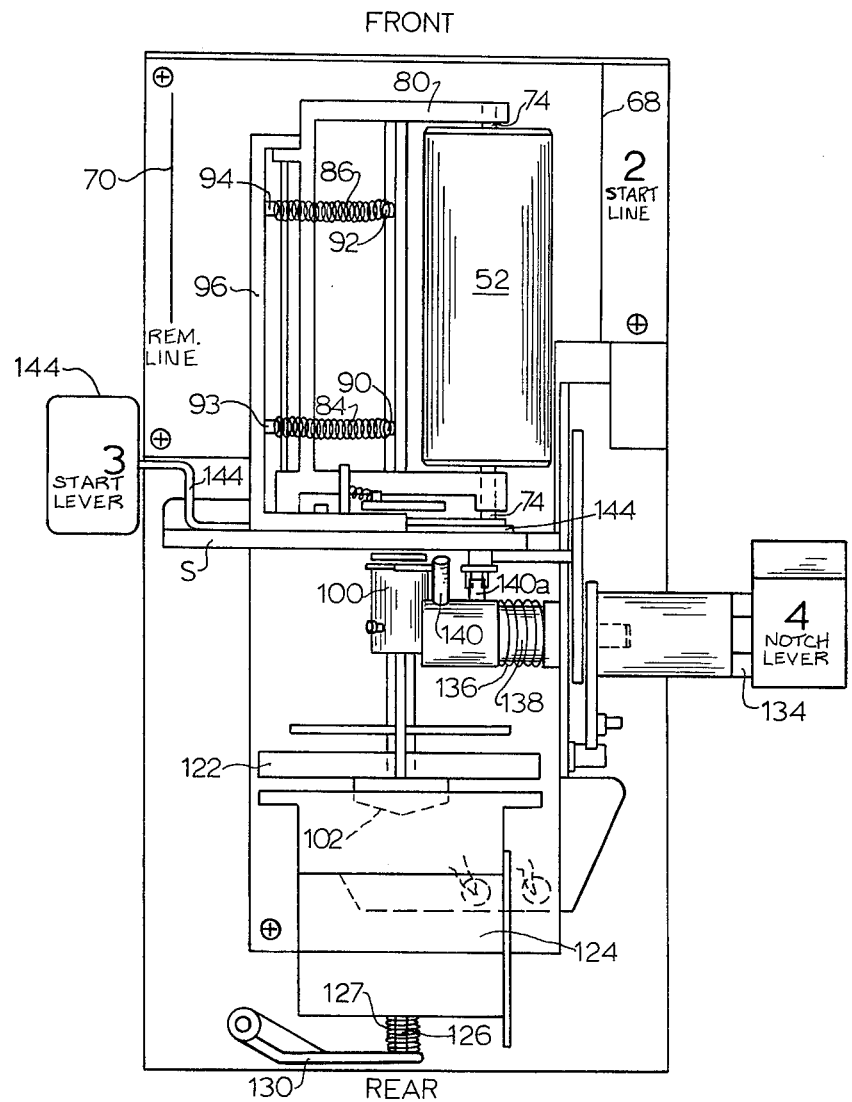
FIG. 4 is a view similar to FIG. 3 with the main circuit boards removed.

FIG. 4 is a top view of terminal 30 with not only the cover but also the circuit boards and related components removed for purposes of illustration. Pressure roller 52 is mounted for rotation on a shaft 74 supported in cradle 80 which is normally biased downwardly about the axis of cradle supporting shaft 82 by a pair of coil springs 84, 86. Springs 84, 86 are connected between bosses 90, 92 on the cradle and similar bosses 93, 94 located on a support member 96. Rearwardly and transverse of cradle 80 there is mounted a vertically oriented support plate S. The rear side of plate S mounts the elements shown in FIGS. 8, 9 and 10 and the forward side mounts the elements shown in FIG. 7. Rearward of support plate S there is shown a drum 100 which is mechanically coupled for rotation with measuring roller 50 by a gear system shown in more detail in FIG. 11. An encoder member 102 is mounted for rotation with drum 100 and serves as the means for developing measuring roller rotation information for the optical position and revolution encoder 103.

Figure 12:
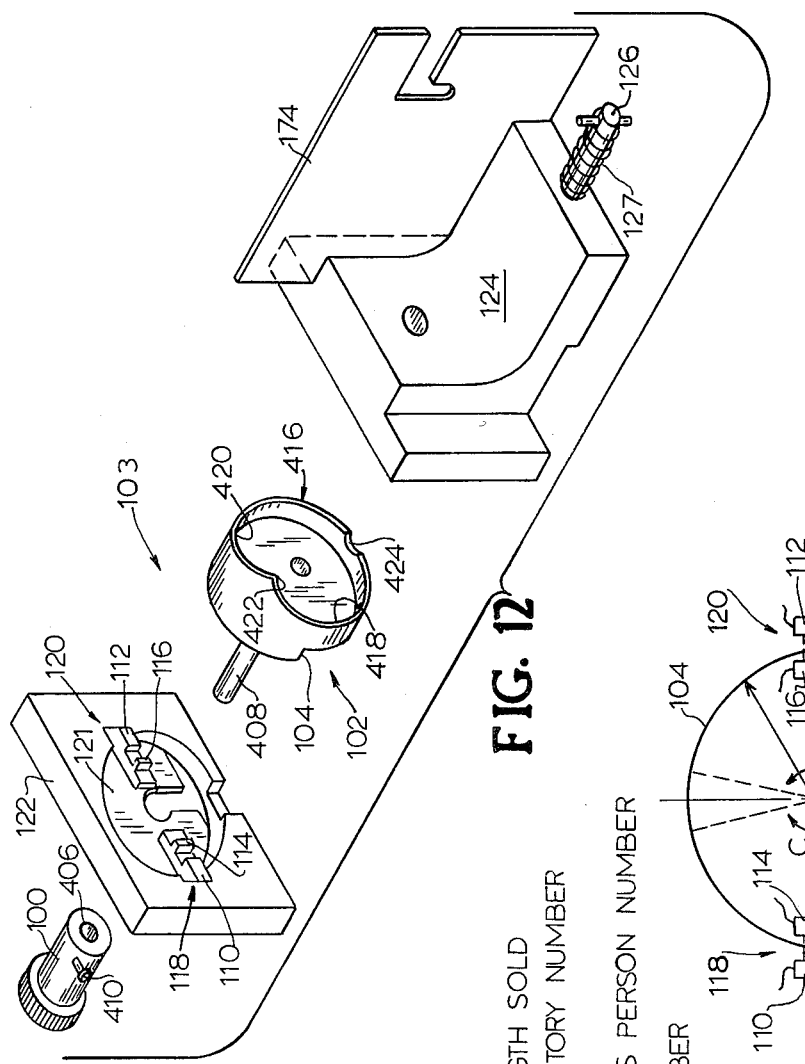
FIG. 12 is an exploded pictorial view of selected elements shown in FIG. 11 as seen from the opposite side.

As explained in more detail below, encoder member 102 includes an integral arcuate light interrupt band 104 (FIG. 11) which is concentric with the axis of rotation of shaft 408 on which it is mounted and which subtends an arc (FIG. 15) of 180°. Band 104 rotates with member 102 so that it intermittently blocks light passing between the light sources 110, 112 and photodetectors 114, 116 of a pair of light emitter/detector assemblies 118, 120 (FIG. 12). Assemblies 118, 120 and associated circuit board 121 are mounted on an optical component housing 122. Housing 122 is secured to a reset frame housing 124 which provides a slidable mounting arrangement for plunger 126 which mounts spring 127 and is arranged to be actuated by reset lever 130 illustrated in FIG. 4. Housing 122 also mounts journal 132 (FIG. 11) which in turn mounts and facilitates rotation of encoder member 102. Housings 122 and 124 are secured to each other and to the terminal frame by any suitable means as, for example, with threaded fasteners.

With continued reference to FIG. 4, the previously-mentioned notch lever 134 is normally biased to its upward rotative position by means of a coil spring 136 mounted around a notch lever shaft extension 138. Extension 138 includes a radially projecting arm 140 which, as later explained in greater detail, interacts with the mechanical linkage elements on support plate S when the notch lever 134 is depressed, i.e., rotated downwardly. This mechanical linkage interaction initiates, in sequence, the locking of drum 100 against rotation in its home position and the raising of pressure roller 52. However, as also later explained, it will be seen that such sequential operation depends upon drum 100 being precisely in its home position.

Figures 6, 7:
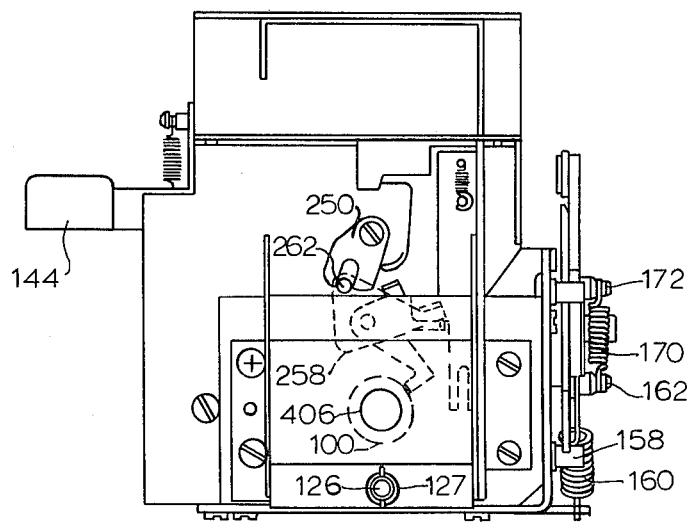
FIG. 6 is a rear view of selected mechanical lock-out elements as mounted on plate "S" illustrated in FIG. 4.
FIG. 7 is a front view of other selected mechanical lock-out elements as mounted on plate "S" illustrated in FIG. 4.

Referring to FIGS. 4 and 7, it can be seen that start lever 144 includes a long integral arm 145 which extends across the front face of support plate S. As explained in detail below, the start lever serves to release the pressure roller cradle 80 by interaction with a link member 146 and its associated hook 148.

Referring to FIG. 5, there are shown the two scissors halves, pivoting scissors half 150, and stationary, horizontally disposed half 152. Pivoting scissors half 150 is rotatable about its shaft 154. Scissors half 150 is biased to the position shown in FIG. 5, where it engages a stop 158, by means of a coil spring 160 connected at one end to a pin 162 on half 150 and at the other end to the terminal frame. When pressure roller 52 is down, scissors half 150 is disenabled against movement toward its mating half 152 by means of the linkage elements on the rear face of support plate S. The disenabling feature and related functions of the linkage are described below.

When pivoting scissors half 150 is free to move, it is moved by means of a plate 166 which also pivots on shaft 154. Plate 166 includes a boss 168 which is engaged by notch lever 134 when the notch lever is depressed, i.e., rotated in a clockwise direction in FIG. 5, causing plate 166 to pivot towards scissors half 150. Thus, boss 168 engages scissors half 150 with continued downward movement of the notch lever 134, drives scissors half 150 until it is substantially horizontal and in engagement with its mating half 152 as required for a fabric notching operation. Plate 166 is normally biased away from scissors half 150 by means of a coil spring 170 connected at one end to pin 162 on scissors half 150 and at the other end to a pin 172 secured to plate 166. However, it should be kept in mind that since rotation of plate 166 depends upon rotation of notch lever 134, the disenabling feature and related functions which control the operation of notch lever 134 will also control the rotation of plate 166 as will be better understood from later description.

Figure 19:
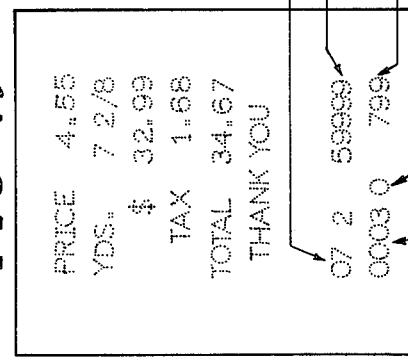
FIG. 19 depicts a typical sales ticket printed by the terminal of the invention.

The employment of a microprocessor control for terminal 30 enables efficient use of a thermal printer. In this regard, it will be noted that FIG. 5 illustrates the location of the thermal printer 174 and paper supply 178. Control for printer 174 is provided by the microprocessor circuitry, as later explained. A suitable printer for purposes of the invention is manufactured by the Texas Instrument Company and is identified as Model No. EPN 9112. As previously mentioned, one of the programmable options allows printer 174 to be controlled so as to print duplicate tickets such as illustrated in FIG. 19 or to advance a predetermined length of blank paper as, for example, when loading a new paper roll.

Figure 13:
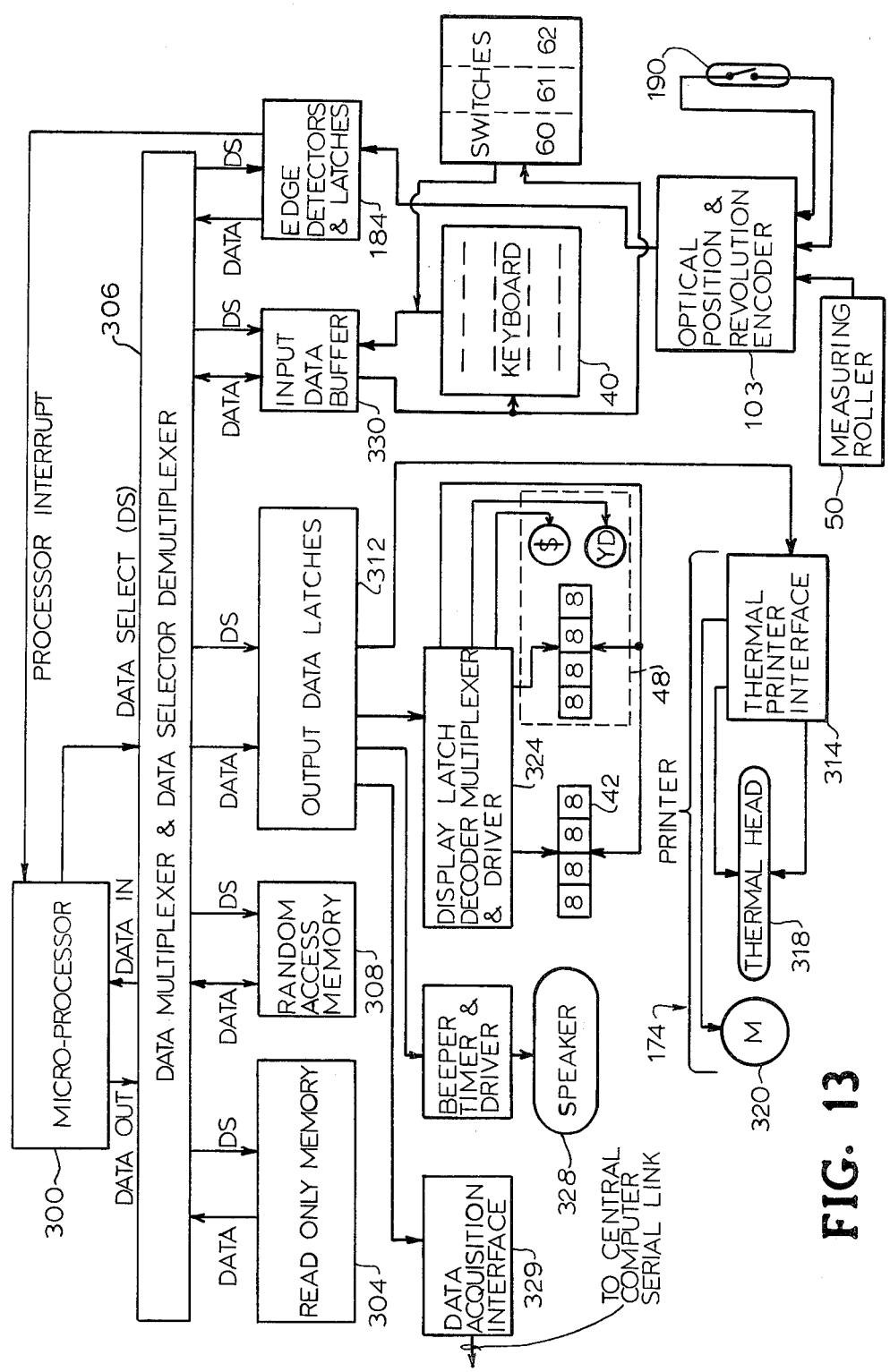
FIG. 13 is a block diagram of the overall system of the invention.
Figure 14:
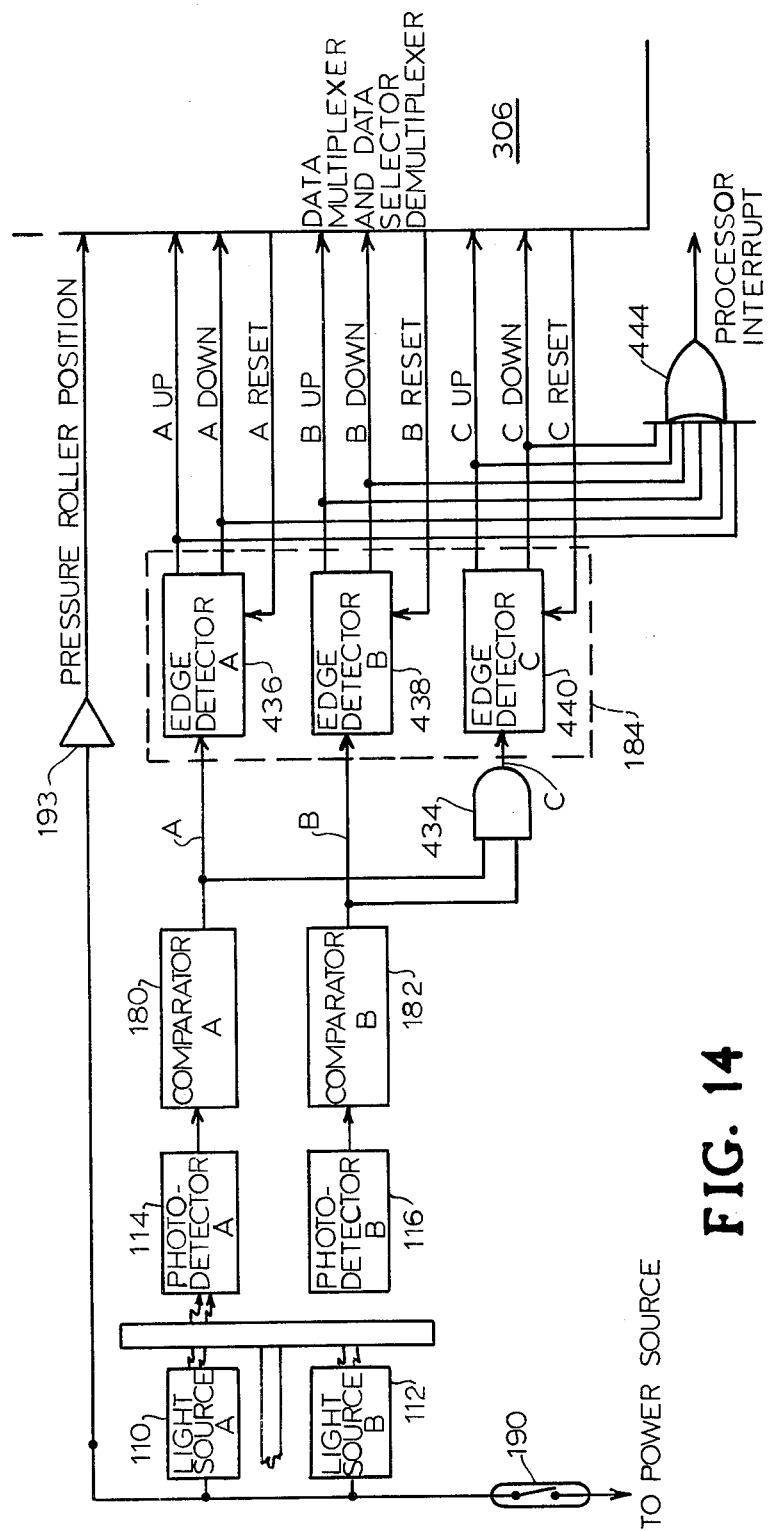
FIG. 14 is a block diagram of the optical encoder data input.

The mechanical elements of the system interface with the electronics at two points. First, when a length of fabric is moved between measuring roller 50 and pressure roller 52, the rotational mechanical response is coupled to optical position and revolution encoder 103 (FIG. 11) to supply information to increment and decrement a count of pulses in the multiplexer (FIG. 13). The optical encoder 103 detects the bidirectional movement of measuring roller 50 via photodetectors 114 and 116, and delivers analog signals to comparators 180, 182 (FIG. 14), respectively, which in turn supply information to the multiplexer via edge detectors 184 (FIGS. 13-14). The second mechanical/electronics interface is established by means of a pressure roller position microswitch 190 (FIGS. 8, 9, 10, 14) which is placed in an "on" or "off" position by a switch arm 191 controlled according to the position of roller 52. Corresponding logic signals (up/down-on/off) flow through buffer gate 193 (FIG. 14).

With this background, additional mechanical aspects of the invention will be described followed by other aspects of the logic and system operation. Since operation of terminal 30 involves both electronic and mechanical manipulations, the electronic manipulations derived by operating keyboard 40 and the manner of enabling and disenabling programmable options will be described after considering related mechanical elements and mechanical operations.

Prior to commencing a measuring operation and at the end of the previous measuring operation, the pressure roller 52 is raised and held in its raised position by the action of notch lever 134 and start lever 144, as later explained. When pressure roller 52 is raised, a gap is created at throat 34 so that the leading end of the fabric to be measured may be inserted. The leading fabric end is then aligned with start line 68 and start lever 144 is depressed, i.e., rotated forwardly as seen in FIG. 3. Start lever 144, when depressed, operates link member 146 and releases pressure roller 52 from its raised position so that the material is clamped between the pressure roller 52 and measuring roller 50. Actuation of start lever 144 also serves to release a mechanical lock-out mechanism later explained in reference to FIGS. 8-10 which enables drum 100 and measuring roller 50 to rotate freely as the material is pulled through the terminal. In this mode, the scissors disenable assembly 192 prohibits the notch or scissors operation of notch lever 134. Separation of the pressure and measuring rollers is also prohibited until the measuring roller shaft has made any number of complete revolutions corresponding to the passage of a length of material ending at a precise ⅛ yard measurement, for example, two and three-eights yards, three and one-half yards, et cetera. The length of the circumference of measuring roller 50 as well as the dimensions of the mechanisms driven by measuring roller 50 are selected with this objective in mind. After such a length of fabric has been pulled through the terminal, notch level 134 may be depressed, i.e., rotated forwardly as viewed in FIG. 3, so that scissors halves 150, 152 create a cut in the edge of the material to indicate the end of measurement. The downward motion of the notch lever 134 and resultant motion of pivotal scissors half 150 is enabled by the positioning of the elements of the scissors disenable assembly 192 illustrated in FIGS. 8-10 and described later in more detail. The downward motion of the notch lever 134 also serves to raise and latch the pressure roller cradle 80 so as to cock and lock the pressure roller 52 in its raised position using the lock-out assembly controlled by start lever 144 (FIG. 3) thereby rendering the terminal ready for the next sale cycle.

Figures 8, 9, 10:
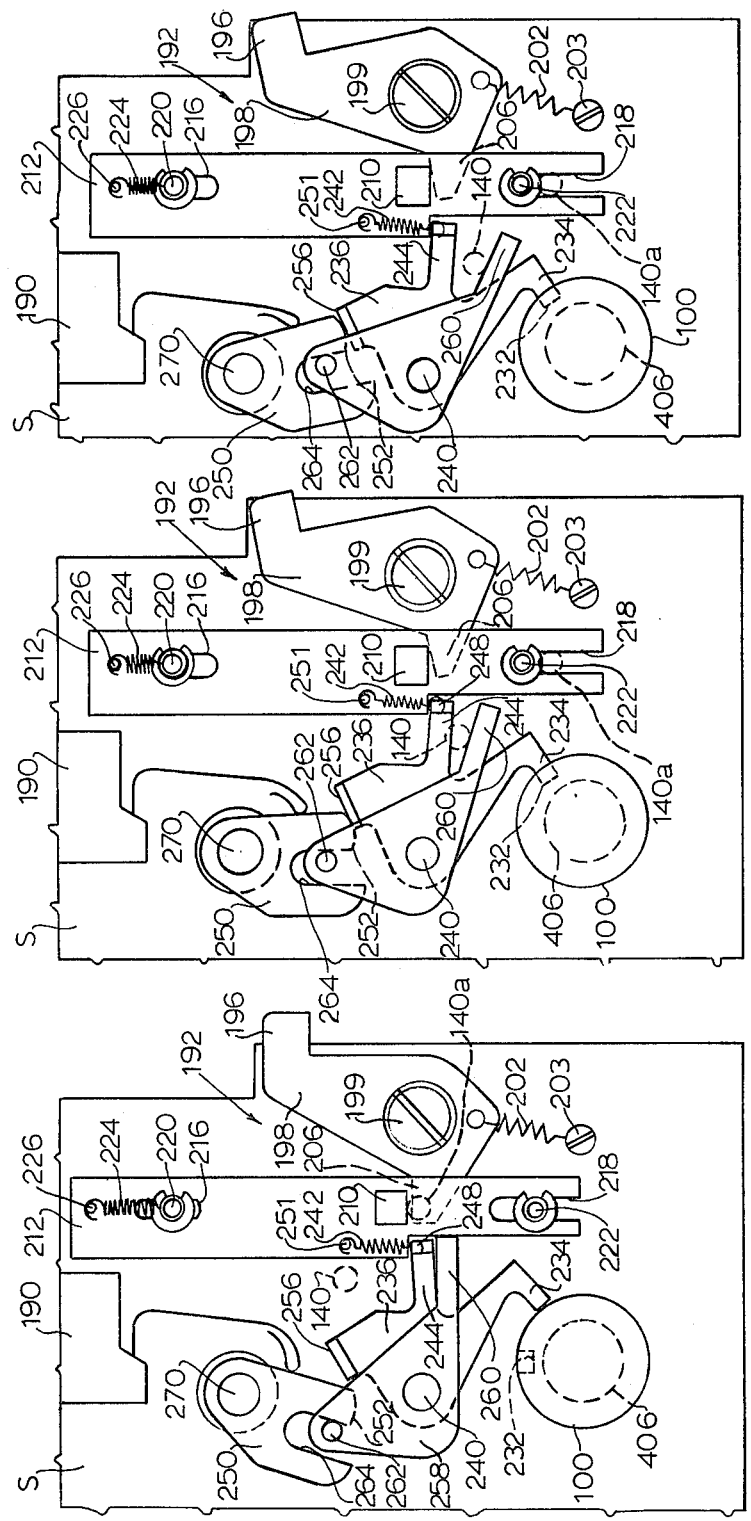
FIGS. 8, 9 and 10 are views of selected elements disposed on the rear face of the central support plate showing, in sequence, the movement of such parts in a typical measuring operation for certain representative positions.

Referring to FIGS. 8-10 for a more detailed description, after pressure roller 52 has been placed in its down contacting position by depressing start lever 144 and the measuring operation is ready to commence, it is desirable that the scissors action be disenabled until such time as the desired length of fabric has been measured out. The scissors action is disenabled by elements located on the rear face of vertically positioned support plate S illusrated in detail in FIGS. 8, 9 and 10. Such elements include an extension 196 forming part of a pivotal member 198 mounted on screw 199 secured in plate S. When positioned in the outwardly extended position shown in FIG. 8, extension 196 is adapted to engage a boss 200 (FIG. 5) mounted on the interface of pivoting scissors blade 150 so as to prevent motion, i.e., disable, of blade 150. Member 198 and its extension 196 are normally held in the scissors disenabling position illustrated in FIG. 8 by means of a coil spring 202 extending between member 198 and fixed pin 203 secured to plate S. Member 198 also includes below and on an opposite side from extension 196 an integral projection 206 which, in the mode illustrated in FIG. 8, contacts a stop member 210 carried on a vertically reciprocal member 212. Member 212 has a pair of slots 216, 218 which receive a pair of pins 220, 222, respectively, for guiding the vertical movement of member 212. A coil spring 224 is secured between pin 220 and another pin 226 projecting from the slide member 212 in order to bias member 212 downwardly. Positioning of stop member 210 controls positioning of extension 196 and thereby controls whether notch lever 134 is enabled or disenabled, all of which will become more apparent as the description proceeds.

As a general observation and for a better understanding of later description, it is recognized that the positionable mechanical elements of terminal 30 as illustrated in FIGS. 4–12 are positioned according to six separate modes. One mode can be stated as being related to the position of the various positionable mechanical elements at the end of a measuring operation when the pressure roller 52 has been raised and the scissors disenable assembly 192 is positioned as in FIG. 10. A second mode relates to the position of the mechanical elements after start lever 144 has been depressed to allow pressure roller 52 to engage the measuring roller 50 but before any fabric is pulled through terminal 30. A third mode is recognized after at least some fabric has been pulled through terminal 30 but less than a ⅛ yard increment. In this third mode, the scissors disenable assembly 192 is positioned as best shown in FIG. 8. In a fourth mode, a ⅛ yard increment or plural ⅛ yard increments have been pulled through terminal 30 but the scissors disenable assembly 192 still remains positioned as in FIG. 8. In a fifth mode related to achieving either a ⅛ yard increment measure or a plurality of ⅛ yard increment measurements, notch lever 134 is partially depressed to lock drum 100 in its home position corresponding to an even ⅛ yard increment measure and also to place extension 196 on member 198 in the enable position for notch lever 134. A sixth mode is achieved when notch lever 134 completes the notching operation which causes the pressure roller 52 to be raised and locked into position, as later explained.

With specific reference to FIG. 8, the elements of scissors disenable assembly 192 are shown as they "sense" and as positioned when pressure roller 52 is down and the material has been pulled through the terminal by an amount not divisible by a ⅛ yard. The positioning of measuring roller 50 is conveyed to scissors disenable assembly 192 by means of drum 100 which rotates in direct response to rotation of measuring roller 50 by means of the gear arrangement best illustrated in FIG. 11. Drum 100 includes a recess 232 (FIG. 8) which, at a unique angular position of drum 100 corresponding to a complete ⅛ yard measurement, is adapted to receive a finger 234 located on a pivotal element 236 mounted on pivot 240. When the pressure roller 52 is down and the measuring roller 50 is not at the completion of a revolution (the condition depicted in FIG. 8), finger 234 is held above or on the outer surface of drum 100. In such position, arm 244 which also forms part of pivotal member 236 engages the vertical reciprocal member 212. Acting against the downward pull of spring 224 on member 212, pin 140a extending radially outward from notch lever shaft 138 (FIG. 4) normally pushes upwardly against member 210 to hold stop member 210 raised and extension 196 on pivotal member 198 in the scissors disenabling position.

FIG. 9 represents the relative positions of the elements comprising the scissors disenable assembly 192 at a time when measuring roller 50 has precisely completed any number of revolutions, corresponding to a ⅛ yard measurement, and finger 234 on pivotal member 236 resides directly over and has engaged recess 232 in drum 100 and the pressure roller 52 is beginning to be cocked. In this regard, it may be noted that finger 234 is normally prevented from residing in recess 232 by reason of pivotal member 236 being biased counterclockwise about its pivot 240 by means of previously-mentioned pin 140a pushng upwardly on member 210 and also by means of spring 242 connected between pin 248 on arm 244 and pin 251 on member 212, lifting arm 244. Thus, for finger 234 to move into recess 232 a mechanical action must be imposed on pivotal member 236 to rotate it clockwise as viewed in FIGS. 9–10. However, when notch lever 134 is first depressed there is in effect a "sense" action during which pin 140a moves down away from member 210. This allows the force of spring 224 to pull member 212 down so as to assert a light pressure on arm 244 of member 236 and thereby force finger 234 into position to touch drum 100. If finger 234 happens to be aligned with recess 232, member 212 will move down under the force of spring 224, member 210 will engage and push arm 206 of member 198 down causing extension 196 to retreat thereby allowing notch lever 144 to continue its downward motion and thereby allowing pin 140 to engage and press arms 260 down so as to rotate member 252 as further explained in more detail. Rotation of pivotal member 236 thus occurs during the depression of notch lever 134 before pin 140 (FIGS. 4, and 9–10) which is mounted on and extends radially outward from notch lever shaft 138 engages arm 260 of pivotal member 258. However, engagement of arm 260 on pivotal member 258 by pin 140 causes member 250 to rotate counterclockwise, as viewed in FIGS. 8–10, to thereby rotate member 236 and force finger 234 downwardly into recess 232 as shown in FIG. 10. At this point, drum 100 and its mechanically coupled measuring roller 50 are locked against further rotation, thereby preventing further movement of the material which is pinched between the pressure and measuring rollers. Therefore, it can be seen that once a successful sense condition has occurred, i.e., finger 234 has entered recess 232, during the depression of notch lever 134, its associated pin 140 acts to lock the sense arm 236 in its position (FIG. 10) via edge 256. The rotation of roller 50 is thus prevented until start lever 144 is depressed to commence the next measuring phase, release pressure roller 50 and allow arm 250 to return to the position seen in FIG. 8. Also to be observed is the fact that during the "sense" portion of the notch action, the operator's force is not applied directly to the sensing mechanism, i.e., finger 234. That is, initial rotation of notch lever 134 during the "sense" action effectively removes the support of pin 140a from member 210 which allows the force of spring 224 to move member 212 downwardly. It is only when this "sense" action can be completed and such "sense" action has been completed that the operator's force on notch lever 134 is transferred through pin 140 to cock member 250 and thereby raise and cock the pressure roller cradle. During this depression of notch lever 134, extension 196 on rotatable member 198 moves to its nonblocking position so that the motion of the notch lever 134 may continue into its notching operation. It is in this second notching phase of operation of notch lever 134 that pivoting scissors half 150 is moved downwardly to a substantially horizontal position so as to engage its mating scissors half 152 for notching the fabric.

During the continued notching phase of the notch lever movement, member 250 on support plate S is driven counterclockwise as viewed in FIGS. 8-10, to move into the position shown in FIG. 10 so that the integral arm portion 252 of member 250 engages a mating surface 256 of member 236 to hold member 236 in what will be referred to as the lockout position. Member 250 is driven by drive element 258, shown in dashed lines in FIG. 6 and in solid lines in FIGS. 8-10. Drive element 258 is mounted for rotation about the same axis 240 provided for rotation of element 236. Drive element 258 includes an arm 260 positioned in the path of movement of pin 140 whenever notch lever 134 is moving through its second phase of motion. A pin 262 on drive element 258 resides in slot 264 of member 250. Thus, when pin 140 engages arm 260 and thereby drives and causes element 258 to rotate counterclockwise, as viewed in FIGS. 8-10, pin 262 on drive element 258 slides within slot 264 and drives member 250 from the position shown in FIG. 9 to that shown in FIG. 10. Member 250 is fixedly mounted on shaft 270 which extends through to the forward side of support plate S and the rotation of shaft 270 drives the mechanism, as later explained, for raising pressure roller 52 as scissors halves 250, 252 are brought together for the notching operation. It will thus be seen that as notch lever 134 is moved through its first and second phases of motion pin 140 is caused to engage arm 260 of drive element 258 so as to bring rotatable member 236 into the position in which drum 100 is locked, member 250 into the position where member 236 is also locked in the position depicted in FIG. 10 and member 198 to the position shown in FIG. 9.

Referring to FIG. 7, there is shown the forward side of support plate S and the means for raising and lowering pressure roller 52 in response to rotation of shaft 270. On the rearward side of support plate S shaft 270 is fixedly connected to a pivotal plate member 272. Member 272 includes a slot 274 that receives the rearward end portion of the pressure roller shaft 74. Thus, when member 250 is driven to the position shown in FIG. 10, shaft 270 rotates member 272 upwardly to the raised position shown in FIG. 7 against the tension of cradle springs 84, 86. This upward movement of member 272 in turn raises pressure roller 52 via its shaft 74 to its raised position, as also shown in FIG. 7. In this raised position, the pressure roller cradle 80 is held by means of hook portion 148 of rotatable link member 146. Element 146 is biased by spring 280 to hold hook 148 under the cradle subject to release by operation of the start lever 144.

To move pressure roller 52 to its down, contacting position and to move the lock-out elements to the position shown in FIG. 8, the start lever 144 is depressed whereby a pin 282 which extends from notch lever 144 depresses arm 284 of pivotal element 146 so that hook 148 moves outwardly away from the pressure roller cradle 80 releasing the same for movement downwardly by the action of springs 84, 86 (FIG. 4). At the same time, via shaft 270, element 250 on the opposite side of support plate S (FIGS. 8-10) moves clockwise to the position shown in FIG. 8 thereby releasing pivotal element 236, under the influence of spring 242, for a counterclockwise rotation to remove finger 234 from recess 232 in drum 100. Drum 100 is no longer "locked out" and pressure roller 52 is thus released for rotation. Also, at the same time, reciprocating element 212, under the influence of spring 224 is moved upwardly to the position shown in FIG. 8 causing stop member 210 to rise thereby allowing member 198 to rotate under the influence of spring 202 and extension 196 of member 198 to move to the scissors disenabling position of FIG. 8.

Certain fundamental operating characteristics may be observed from what has been thus far described. Whenever locking arm 234 is engaged in recess 232, pressure roller 52 is raised and cocked in the raised position. At the same time, detectors 114, 116 are both covered and the pressure roller position switch 190 is electrically open. Thus, whenever pressure roller 52 is raised switch 190 is electrically open. Also to be observed is that whenever the locking arm 234 is engaged in recess 232, the measuring roller 50 is locked and cannot rotate but at the same time the scissors blade disable lever 198 is free to retreat as in FIGS. 9-10. Of course, whenever start lever 144 is operated pressure roller 52 is released and the foregoing conditions are altered accordingly.

Prior to completing the description of the mechanical elements and specifically the mechanical construction of the optical encoder 102, attention will be directed to the overall electronics system as depicted in FIG. 13. By way of background, mention was previously made of the interface between encoder 102 and the electronics of terminal 30 through which derived positional information related to measuring roller 50 reaches the electronic circuitry for processing. Reference was also previously made to switch 190 which provides the electronic circuitry with information concerning the position of pressure roller 52. Reference has also been made to keyboard 40 through which other information is entered into the electronics. Additionally, note has been made of the provision of the option selection bank switches, 60, 61 and 62, for setting or enabling the various terminal options. The position of option selection switches 60-62 is scanned each time processor 300 is powered up and is stored in the random access memory 308. With these various data entry and data selection devices in mind, the description next proceeds to a more detailed discussion of the electronic elements and particularly as referred to in FIG. 13. The efficiency, accuracy and convenience of the terminal are derived directly from the processor architecture (FIG. 13) which gives the processor direct control over all of the components. Software instructions are stored in the read only memory 304 and direct the processor, i.e., by software control, to accomplish various tasks in conjunction with associated circuitry. A significant element in the overall system illustrated in FIG. 13 is the microprocessor 300 provided for manipulation of the data, information, and associated hardware circuitry related to the measuring and pricing operation accomplished by terminal 30. With continuing reference to FIG. 13, the program and data constants are stored in a read-only memory 304. The data flows through a multiplexer 306 controlled by microprocessor 300. The sale data and other variables are stored in the random access memory 308. The variables stored in random access memory 308 are printed under the control of processor 300. Each character's shape is stored in read-only memory 304 and processor 300 translates that information to dot positions which are latched as dot data in the output latches 312 which drives the high voltage thermal printer interface 314. The printer interface 314 in turn causes the thermal head 318 to generate heat whereby to create dots on the thermal-sensitive paper. These dots when placed in a matrix create the characters printed out on the ticket illustrated in FIG. 19. Microprocessor 300 also controls the paper advance motor 320 such that motor 320 will advance the paper after each row of dots has been "burned" into the paper. All the character forming information and timing is controlled by the microprocessor 300 for the alpha-numeric ticket characters.

Through the output latches 312, the microprocessor 300 also programs the display latch decoder multiplexer and driver 324 which drives the eight segment-multiplexed LED displays of displays 42 and 48. Display controller 324 drives the two 4 digit LED indicators, i.e., displays 42 and 48. To inform the customer whether length information or price information is being displayed, processor 300 drives the two discrete indicators 42, 48 which light up "$" or "YD" next to the customer display 48. As previously referred to, an important advantage provided by terminal 30 is the provision of both audible and visual cues for instructing the terminal operator on a step-by-step basis and indicating when errors have been made in the measuring operation. In this regard, beeper timer and driver 26 and the associated speaker 328 illustrated in FIG. 13 provide audio feedback and thus audible cues under the control of microprocessor 300 when the keys on keyboard 40 are being pressed and as an indication to the operator while in the length measurement mode that the measuring roller 50 is in a "cue" position and that the sale may be terminated at this location. That is, a beep signal is provided to the operator each time measuring roller 50 has completed a ⅛ yard increment measurement. Through an opto-isolator at a data acquisition interface 329, microprocessor 300 may send out, if the central computer transmit option is enabled, all of the pertinent sales information after the sale cycle is completed. Processor 300 serializes the data and monitors a "hand shake" signal from the central computer via two opto-isolators and appropriate conditioning circuitry associated with interface 329. Such information includes the total sale price, yards sold, remnant sold, material inventory number, sales person number, ticket number and terminal number. Of course, it will be appreciated that by use of the available options, the measurement can be produced in either metric or English units, the tax charged or not charged, and other items such as inventory, sales person, and ticket numbers either entered or not entered for printing out and or central computer storage.

The keyboard 40 has sixteen keys arranged in a four-by-four matrix (FIGS. 3 and 13). The microprocessor 300 scans the keyboard via the input data buffer 330 and encodes each keyboard key switch closure. The switch closure is "debounced" by the processor 300 program to insure that only one character will be recorded per user depressing keyboard. The interface to the optical position and revolution encoder 103 is accomplished via the edge detectors and latches 184 and the previously-mentioned photodetectors 114, 116. Optical information related to the angular position of the measuring roller 50 is controlled by interrupting the light source to the photodetectors 114, 116 by means of the band 104 of the encoder member 102. Also, switch 190 (FIGS. 8–10 and 13) provides a means for switching off the light source to the photodetectors 114, 116 when the pressure roller 52 is in a raised position and encoder 102 is not required to be in use.

Since the optical and electromechanical elements of the encoder 102 are believed to provide a unique encoder construction and unique advantages for terminal 30, reference will next be made to FIGS. 11 and 12 for completion of the mechanical description and with more specific reference to the structure and operation of encoder 102. In FIGS. 11 and 12, it will be noted that measuring roller 50 is mechanically coupled to drum 100 by means of intermediate offset gears 400, 402. Drum 100 has an internal bore 406 which receives the shaft 408 of encoder member 102. Drum 100 is secured to shaft 408 at a predetermined angular orientation by suitable means such as, for example, the set screw 410. As later explained, this angular orientation is selected such that the proper optical condition is detected by the encoder 102 when the measuring roller is in the "cue" position corresponding in English units to a ⅛ yard increment measurement.

Shaft 408 rotates within a shaft bore provided in housing 122. Housing 122 carries the opposed photodetectors 114, 116 on circuit board 121 mounted on housing 122. The gaps between the light sources 110, 112 and the photodetectors 114, 116 are intermittently blocked by means of the arcuate light interrupter band 104. Thus, the angular positioning of band 104 and, therefore, the angular position of the coupled measuring roller 50 is sensed by the presence or absence of light at photodetectors 114, 116.

The rearward face of encoder member 102 forms a double-sloped cam 416 which is useful for bringing member 102 and its connected drum 100 to the "cue" position. Cam 416 comprises a pair of curved cam portions 418, 420 which meet at an apex 422 and at a detent 424 located 180° from the apex. Cam 416 is positioned by means of engagement with a roller bearing cam actuator 428 formed at the end of reset plunger 126 which is loaded by spring 127 and is operated by means of the pivotal reset lever 130 (FIG. 2).

In operation, when it is desired to move cam 416 from any intermediate position, corresponding, for example, to the position of the mechanical elements shown in FIG. 8, to the cue position corresponding to the position of the mechanical elements illustrated in FIG. 10, reset lever 130 is depressed against the spring loading of plunger 126 to drive cam actuator 428 into engagement with sloped cam 416. An example of a need for placing cam 416 in the cue position would be the situation in which the operator of terminal 30 is terminating a remnant to reset after a remnant measurement. The shape of cam 416 is such that with full depression of the reset lever 130, cam actuator 428 will ride along one of the cam surfaces thereby turning cam 416 of encoder 102 until actuator 428 resides in detent 424. Shaft 408 is angularly oriented within and secured to drum 100 so that by the described action and using the gear train provided by gears 400, 402, operation of reset lever 130 acts to return both drum 100 and measuring roller 50 to the unique cue position. Rotation of cam 416 is also facilitated by means of the journal 132 formed on housing 124 on which cam 416 is mounted with housing 124 being secured to the forward face of housing 122 by screws or other suitable means.

Figure 15:
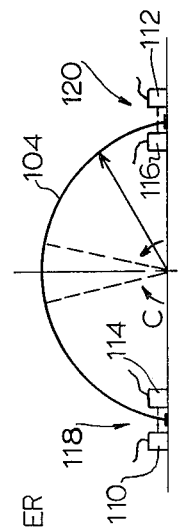
FIG. 15 is a schematic representation of portions of the optical encoder assembly.

In order to more fully explain the manner in which the electrical signals are developed corresponding to the various positions of measuring roller 50, reference is made to FIG. 15 which schematically shows the manner in which arcuate band 104 interfaces with the photodetectors 114, 116. Arcuate band 104 subtends an arc of 180°. Detectors 114, 116 are purposely not located on the encoder diameter but are elevated slightly above the diameter, e.g., by about 1/16" such that arcuate band 104 can move through an angle C while still blocking light transmission to both detectors 114, 116. Since the blockage of light transmission at both detectors indicates alignment, angle C represents that angle through which drum 100 and arcuate band 104 can turn while maintaining a software deduced state corresponding to the "cue" condition. The size of angle C determines the leeway the operator has in bringing the fabric to the alignment region and is selected to comply with the accuracy requirements of the National Bureau of Standards, on the one hand, and to make terminal 30 easy to operate, on the other hand.

With continuing reference to the manner in which the electrical signals are developed in correspondence with the directional and rotative positions assumed by measuring roller 50, it will be noted in FIG. 14 that the respective outputs of the photodetectors 115, 116 are routed to the respective comparators 180, 182. As further illustrated in FIG. 14, the comparators 180, 182 transform the analog signals from the photodetectors 114, 116 to two digital signals designated A and B, whose logic levels correspond to the state of illumination on each detector. The digital signals from both comparators are fed to AND gate 434 to generate a third digital signal C which is logic one only when both photodetectors are obscured. The three digital discrete signals A, B and C are routed to three edge detectors 436, 438, 440, respectively, and which are adapted to develop "Up" and "Down" signals dependent on the condition of the respective incoming signals A, B and C. The outputs of the edge detectors thus provide the microprocessor 300 with information on any transition of the three input signals A, B and C. Such Up-Down information is latched until microprocessor 300 resets the latches enabling new transitions to be latched. Interrupt gate 444 enables any transition occurring with respect to signals A, B and C to interrupt the microprocessor 300 from its current task and cause the microprocessor to read the state of each of the edge detectors 436, 438 and 440 and reset each of them after the reading operation thus enabling them to catch the next transition.

The algorithm for processing the transition information is described by the flow chart shown in FIG. 17 which will be explained in conjunction with a sample encoder motion, i.e., motion of encoder band 104, depicted in FIG. 16. A software flag labeled "S" is used by the microprocessor 300 to resolve the direction of movement and the cue region. S equals 1 indicates that a clockwise revolution of encoder band 104 has commenced. S equals −1 indicates that a counterclockwise revolution has commenced. S equals 0 indicates that cam 416 of encoder 102 and measuring roller 50 are in the cue position and that the sale may be terminated.

The length measurement starts in the cue position (S equals 0) in which drum 100 and its coupled measuring roller 50 were locked at the termination of the previous sale corresponding to the position of the mechanical elements illustrated in FIG. 10. The clockwise movement of the arcuate light interrupt band 104 to position I as seen in FIG. 16 will cause a down transition on signal A since the "A" detector 114 is now exposed to the "A" light source 110. The transition on signal A will cause a down transition on signal C. The microprocessor 300 using the steps 450, 452 and 454 shown in FIG. 17 reads and resets the latches associated with the edge detectors 436, 438 and 440 shown in FIG. 14. Since a down transition on signal C occurred, microprocessor 300 proceeds to evaluate the direction of the motion through the flow diagram steps 460 and 478 (FIG. 17). Flag S is set to 1 indicating a clockwise rotation via step 480 since a down transition on signal A occurred. The next interrupt occurs when the "B" detector 116 is exposed during movement of encoder band 104 from position I to position II. Since no C transition accompanies this event, the result is simply the resetting of the latches in edge detectors 436, 438 and 440 for the next transition. The same result occurs for the up transition of signal A in position II. An up transition of signal C in position III is caused by both "A" and "B" detectors 114, 116 being obscured by the interrupt band 104. Microprocessor 300 then follows the C up steps shown in FIG. 17 as steps 462 and 464. Since S was set to 1 previously and a B up transition was simultaneous with the C up transition, microprocessor 300 follows steps 464, 466 and 468 illustrated in FIG. 17 resulting in incrementing the length counter, a BCD counter implemented in software, by one and resetting S to 0. As long as both of the detectors 114, 116 are obscured, the measuring roller 50 is free to roll through angle C (FIG. 15) without changing the direction or count information.

Figure 16:
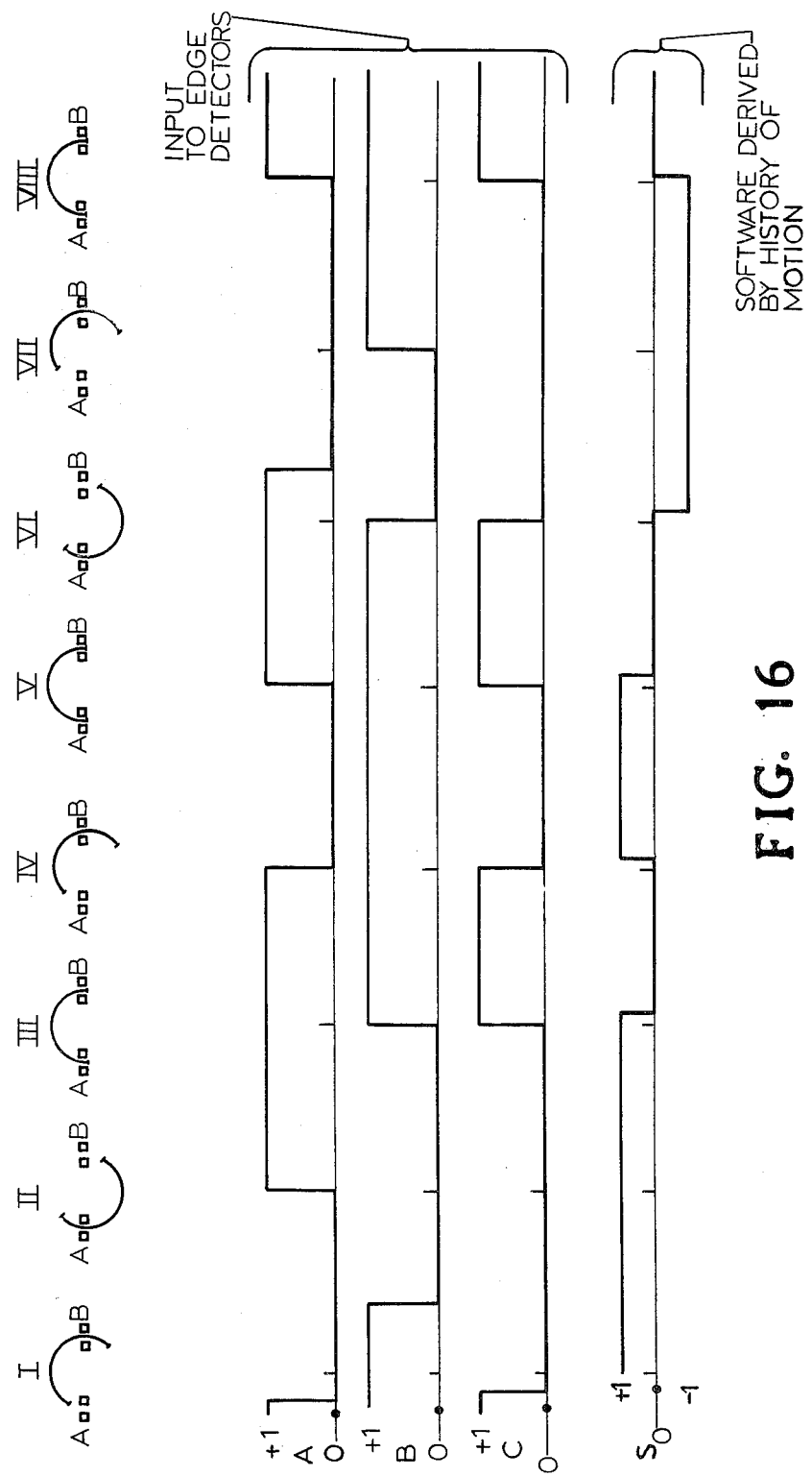
FIG. 16 is a graphic depiction of representative encoder motions and the functional signals generated by such motions.
Figure 17:
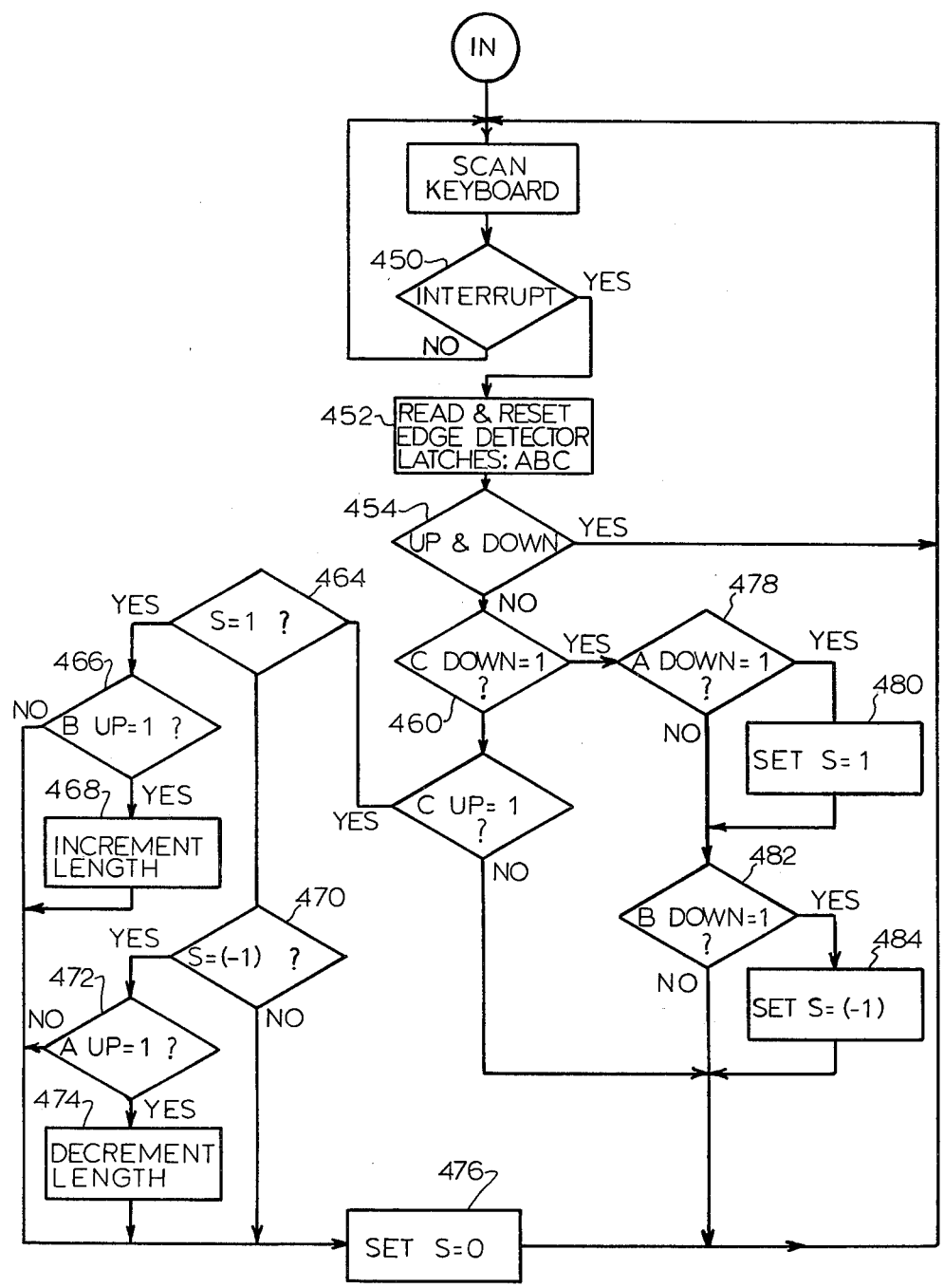
FIG. 17 is a detailed logic block diagram of the processing of the digital information from the optical encoder.

With continued reference to the motion of band 104 illustrated in FIG. 16, assume that the encoder band 104 continues a clockwise rotation through position III. S is set to 1 following the down transition of C. Assume in reference to FIG. 16 that the encoder band 104 then rotates counterclockwise without completing the revolution, back to position IV. In this event, the up transition of signal C is simultaneous with an up transition of signal A. Microprocessor 300 will then follow steps 464 and 466 of FIG. 17 and will skip to step 476 of FIG. 17 without affecting the length counter since the net encoder angular motion, i.e., motion of band 104, was 0. If the counterclockwise rotation is continued to position IV of FIG. 16, the S flag is set to −1 following steps 460, 478, 482 and 484 of FIG. 17 since the down transition of C was simultaneous with a down transition on B. Assuming in another situation a full counterclockwise revolution takes place through position VII to position VIII of FIG. 16, the up transition on C will be simultaneous with an up transition on B causing the microprocessor 300 to go through steps 462, 464, 470, 472 and 474 of FIG. 17 which in turn results in decrementing the length counter and resetting S to 0.

An important advantage of the terminal 30 configuration is that of providing immunity to electrical noise and mechanical jitter. This is important since any electrical noise generated by static discharge resulting from operator handling of the fabric during measuring or electrical line noise can potentially disturb the signal output of encoder 102 by upsetting the length counter, resulting in false length indication. In known electronic fabric measuring devices, the mechanical and the electronic lockouts are thrown out of synchronization due to added and extraneous noise pulses. In contrast, the encoder 102 of the present invention by reason of its construction and relation to the associated circuitry shown in FIG. 14 is immune to such noise and has been found to be capable of reliably finding the correct cue position with the initial preset accuracy. In addition, microprocessor 300 effectively acts to strip off electrical noise by reason of the flow diagram step 454 seen in FIG. 17. Electrical noise spikes when present noticeably cause an up and down transition of the detector signals produced by photodetectors 114, 116. In such event, both transitions when caused by noise will be recorded by the edge detectors 436, 438 and 440. Since no mechanical encoder motion can be fast enough to cause an up and down transition before the first transition is read and the edge detectors 436, 438 and 440 reset, the microprocessor 300 exhibits the significant advantage of being able to discard any information from an interval when both up and down transitions were present on the same signal presented on by flow diagram step 454 of FIG. 17. Thus, the construction of encoder 102 in conjunction with the circuit configuration of FIGS. 13 and 14 and particularly in view of the presence and operation of edge detectors 436, 438 and 440 when taken in conjunction with the manner in which the signals are processed essentially make terminal 30 immune to electrical noise.

Due to the unique characteristics of the encoder, only two meaningful events need to be processed for each revolution of measuring roller 50. These events are up and down transitions on the C signal. In contrast, mechanical jitter of cloth in prior art apparatus caused both erroneous outputs and missing output pulses. However, with the present invention if the C signal goes up and down in rapid sequence corresponding to rapid back and forth movement of the cloth, the transition is ignored by reason of step 454 in FIG. 17. That is, in such an abnormal measuring roller reverse situation, the up/down C signals are effectively read at the same time. In contrast, in a normal measuring roller situation, the C up and down signals are read separately and processed normally.

Operation of terminal 30 involves eleven identifiable and separate modes or states of terminal operation and seven mode options. The seven available options include the option of metric or English units which in turn fix the counting, computing and display in a corresponding format, the second ticket option which enables a second ticket to be printed with the vital transaction information, the inventory number option which enables the operator to input an inventory number, the sales person option which enables the operator to input the sales person number, the transmit option which enables terminal 30 to transmit vital transaction information to a central computer on a shared link with each terminal having an assigned terminal number, the transmit test option which presets the terminal number to zero and exercises the central computer communication link for test purposes and, finally, the self-test option which causes a check of the displays and printer. Dependent on which options have been selected, the various terminal modes or states will be governed accordingly.

For purposes of reference, the following eleven terminal operating modes are described:

Mode 1: This mode relates to the idle state in which terminal 30 operates so as to blank all displays and remain in this state until one of the following keys has been depressed. Should the "GO" key be depressed, terminal 30 will proceed to mode 4. Should the "CAL" key be depressed, the terminal operation will proceed to mode 11. Should the "STOP" key be depressed, terminal 30 will advance three inches of paper as, for example to help load a new paper roll and will restart mode 1.

Mode 2: In this "Price Per Length" mode, terminal 30 will display "P" on the operator display and the "$" light on the customer display. The operator will enter the price per yard which will be displayed on both the operator and the customer displays in a shift-left manner with a preset decimal point between the second and third digits. The entry will be terminated by depressing the "GO" key, after which the terminal 30 operation will proceed to mode 5. Should the price entry be four digits long, the terminal 30 operation will execute the "GO" automatically, thus preventing the operator from entering more than four digits for the price. Should the "STOP" or any other non-numerical entry be depressed, terminal 30 will display "E" on both operator and customer displays, beep twice and restart mode 2. Should the "STOP" key be pressed, the terminal 30 operation will return to mode 1.

Mode 3: In this "Inventory Number" mode, the terminal 30 operation acts to first check to determine if the inventory number option is enabled. Should this option be disabled, the terminal 30 operation will proceed to mode 5. However, if the "Inventory Number" option is enabled, the terminal 30 operation will display "I" on the operator's display. The operator will enter the five digit inventory number. Terminal 30 will then display the entry in a shift-left manner on the operator display. Each entry will be acknowledged by an audio beep. Should the "STOP" key be depressed, the terminal 30 operation returns to mode 1. Should any other non-numerical key be depressed or should the internal number check be incorrect, terminal 30 will display "E" and beep twice and restart mode 3, otherwise the terminal 30 operation will proceed to mode 4.

Mode 4: In this "Sales Person Number" mode, the terminal 30 operation will check if the sales person number option is enabled. Should this option be disabled, the terminal 30 operation will continue to mode 5. However, if the sales person number option is enabled, the terminal 30 operation will display "S" on the operator display. The operator will enter three digits. Terminal 30 will display the entry in a shift-left manner on the operator display. Each entry will be acknowledged by an audio beep. Should the "STOP" key be pressed, the terminal 30 operation will go to mode 1. Should any other non-numerical key have been pressed or should the internal number check be incorrect, the terminal 30 operation will display "E" indicating an error, will beep twice and will start mode 4 again. Otherwise, the terminal 30 operation will proceed to mode 5.

Mode 5: In this "Length Measurement" mode, terminal 30 will display "L" on the operator display and light the "YDS." light on the customer display. The operator will align the material on the start line and depress the "START LEVER". Terminal 30 will display 00 0 on both displays and sound the beeper. The operator will pull the desired length through terminal 30 from left to right as viewed in FIG. 2 watching the displayed reading on the operator display. Since sales are made in increments of ⅛ of a yard or ten centimeters, depending on the metric-English option selected, the terminal 30 operation will indicate each such increment by an audio beep and providing two visuals dots on the operator display (XX. .X). Direction information will be provided by the same two dots indicating to the operator the direction in which the material is being pulled (XX .X forward) and (XX. X backward). The operator will be able to terminate the sale only when the increment indicators are enabled. Should the customer wish to buy the remaining material on the bolt as a remnant, the operator will press "REM" and the terminal 30 operation will proceed to mode 6. Otherwise, the operator will depress the notch lever and the terminal 30 operation will proceed to mode 7.

Mode 6: In this "Remnant Sale" mode, terminal 30 will operate to zero both length displays and the operator will continue to pull the fabric through terminal 30. The length counters will measure the fabric length passing through terminal 30 until the end of the material reaches the end line. The operator will stop pulling the material and press the "END" key. Next, the operator will pull the fabric out of terminal 30, press the reset lever 130 and depress the notch lever 134. The terminal 30 operation will next proceed to mode 7 after measuring the remnant fabric to the last 1/16 of a yard or last 5 centimeters, depending on the option selected.

Mode 7: In this "Subtotal Display" mode, the terminal 30 operation will calculate the subtotal price (less tax) and display it on both the operator and customer displays activating the "$" light on the customer display. Should the length measurement include a remnant, the terminal 30 operation adds the cost of the remnant (based on half-price) to the subtotal before displaying it.

Mode 8: In this "Ticket Printing" mode, the terminal 30 operation will print a ticket as illustrated in FIG. 19. Should the tax option be disabled, the terminal 30 operation will delete all tax reference from the ticket. Should the metric option be enabled, all calculations and units will be in meters. The ticket counter is automatically preset to zero when terminal 30 is powered up and is incremented after each ticket is printed.

Mode 9: In this "Second Ticket" mode, should the "2 P" option be enabled, the terminal 30 operation waits for the operator to press the "GO" key. Once the operator tears off the first ticket and presses the "GO" key, the terminal 30 operation will print a second ticket with the encoder sales data as illustrated in FIG. 19.

Mode 10: In this "Transmit Information" mode, operation is dependent on whether or not the "transmit" option has been enabled. Should this transmit option be enabled, terminal 30 will transmit the sales data to a central computer as illustrated in FIG. 18 using a serial link shared with other terminals of construction like terminal 30. The status of the transmission is displayed on the operator display. When the transmission has been completed, the transmitter 30 operation returns to mode 1 to await start of the next sales cycle.

Mode 11: In this "Calculator" mode, the terminal 30 operation will display "L" on the operator display and will accept up to three digits input followed by "GO" indicating the desired length. After the "GO" key has been pressed, the terminal 30 operation will display "P" on the operator display and will accept up to four digits in a manner similar to that described in mode 2. Terminal 30 will then display the subtotal on both customer and operator displays for thirty seconds and return to mode 1.

With the foregoing general description of the operational modes and option modes in mind, a more specific and typical operational sequence of the fabric point-of-sale terminal of the invention will be described as follows, with reference being made to FIG. 19 which depicts a sales ticket printed by the terminal.

The operator starts the sale cycle by entering via keyboard 40 the price of the item, e.g., $2.59 (FIG. 19). This entry appears on both operator and customer displays 42, 48 and a short beep from speaker 328 accompanies each key press. When the price has been entered, the operator presses "STOP". The terminal responds with an "I" on the left most digit of the operator display 42. The operator then must enter the inventory number, e.g., 12345. Each digit is displayed on the right most digit of the operator display as it is entered. The terminal will not proceed to the next mode or step until the inventory code has been entered.

Next, terminal 30 will respond with "S" on the left most corner of the operator display 42. The operator will then enter his or her sales person number, e.g., 125. The terminal will respond with the letter "L" and wait for the start lever 144 to be activated so as to release pressure roller 52 from its raised position. After the operator has aligned the material on start line 68 and pressed the start lever 144, both operator and customer displays 42, 48 will show "00..0" and the beeper will activate. After the material is moved to the right a sixteenth of an inch, the terminal will display "00 .0" and the beeper will go off. When the operator is within a sixteenth of an inch of the first eighth of a yard (where the mechanical lockout is disabled) the display will show "00. .1" and the beeper will go on. At this time, when both dots and the beeper are on, the sale can be terminated. If the operator moves the material slightly backward, the display will show "00. 0" and the beeper will be off.

After the operator has measured the desired length, e.g., 12⅝ yards, the display will show "12. .5" and the beeper will go on. At this time, the operator can press down the notch lever 134 and notch the material as well as raise the pressure roller 52.

The terminal will display "P" for one second and then the price of the sale will be displayed, e.g., "$32.70". The printer will print the first ticket and wait for the operator to tear it off and press "GO" after which the duplicate second ticket will be printed.

After the printing is completed, the terminal will send all the relevant information to the data acquisition interface 329. At this time, the terminal will turn off all displays and wait for the next machine cycle to commence.

Also to be noted as an advantage is that anytime the STOP key is depressed once, the step previously entered can be corrected. When the STOP key is depressed twice the terminal returns to an idle state. Further, anytime S, P or I are displayed the STOP key is returned to mode 1 condition.

Terminal 30 may be enabled, as previously mentioned, for several optional features and continuing with the typical operational sequence are described as follows:

1. Remnant Sale: Should the customer wish to buy the remaining material on the bolt as remnant, the operator will press "REM". The terminal will then zero both length displays on the operator and customer displays 42, 48 and the operator will continue to pull the fabric through the terminal. The length counters will measure the fabric length passed through the terminal until the end of the material reaches the remnant line 70 (FIG. 3). The operator will then stop pulling the material and press the "GO" key. The operator will pull the fabric out of the terminal, press the reset lever 130 and then depress notch lever 134. Due to the shape of the encoder light interrupt band 104 and the positioning of the associated light sources 110, 112 and photodetectors 114, 116, the terminal is able to measure the remnant sale to the nearest 1/16 yard. This is possible because at the beginning of any remnant sale operation the terminal, and therefore the interrupt band 104, will be in cue position wherein both of the photodetectors 114, 116 are obscured. Since band 104 must rotate approximately 180° to go from the cue position to a position where both photodetectors sense light, the terminal may readily calculate each 1/16 yard advancement of fabric every time both photodetectors are either obscured or not obscured.

2. The terminal may be programmed to calculate a tax on each transaction. Should the length measurement include a renmant, the terminal will add the cost of the remnant (typically based on half price) before calculating the tax. The tax is added to the ticket.

3. By replacing the conventional measuring roller having an outside diameter of ⅛ yard with a substitute roller having an outside diameter of 0.1 meter and appropriate option selection, the operation of the apparatus may be converted to metric operation.

4. Referring to FIG. 18, the terminal may be enabled to transmit all sales data to a central computer using a serial link shared with other terminals. The status of the information transmission may be displayed on the operator display until complete, at which time the terminal will return to the idle state to await the next sale cycle.

In summary, the following significant features of the invention are achieved:

(a) An essential noise and jitter-proof terminal is achieved with improved optical encoding and signal processing.

(b) A thermal printer uniquely incorporated in the terminal is provided.

(c) Visual cues for directing the operator to the next operation after accomplishing one operation is provided.

(d) Audible cues for directing the operator through both data input and measuring operations is provided.

(e) Both visual and audible cues are provided to warn the operator of errors.

(f) When correctly operated, automatic programmed sequencing from step-to-step is provided.

(g) Proper notching positions are specifically visually and audibly cued.

(h) Each terminal constructed according to the invention is adapted to become a part of a large central computer system in which significant transaction information for each sale can be transmitted from each terminal in the system to a central computer for processing.

(i) A software scanned keyboard is provided thereby eliminating use of thumbwheel switches for input data as in prior art devices.

(j) Ease of operation is facilitated by use of a single keyboard for entry of price, sales person and inventory numbers.

(k) Customer and operator displays are uniquely incorporated and operated in the terminal.

(l) An improved mechanical lock-out mechanism for the measuring roller is provided.

(m) An improved optical encoder lookout is also provided insuring the presence of optical readings only when the pressure roller is lowered.

(n) Most significantly, remnant sales either is a specific transaction or in conjunction with a normal transaction involving the sale of a specific number of measured increments is provided.

(o) Subtotal display, sales person number, inventory number, choice of English-metric units, tax, second ticket, central computer transmit, calculation of a price for a given length desired by customer, transmit test and self test are all provided as programmable options.

(p) A unique optical and mechanical reset mechanism for returning to a cue or home position.

(q) Finally and most importantly, the optical encoder itself provides unique advantages over prior art encoders both in the construction and mode of operation and substantially contributes to electrical noise and mechanical jitter immunity.

While the instant invention has been described by reference to preferred embodiments thereof, it will be appreciated by those skilled in the art that modifications may be made without departing from the true spirit and scope of the invention.

I claim:

1. A processor controlled apparatus for measuring and pricing lengths of material such as fabric, or the like, comprising:

(a) a base structure having a horizontal throat for passage therethrough of a margin of the material to be measured and below said throat a measuring roller adapted for rotation;

(b) a pressure roller adapted for rotation around an axis above and parallel to the axis about which said measuring roller rotates;

(c) a resiliently loaded pressure roller support structure mounted on said base structure and being movable between an elevated position for insertion and removal of said material and a lowered position in which said pressure roller resiliently engages said measuring roller enabling said material to be pulled through said throat and thereby rotate both said rollers;

(d) releasable latching means carried by said base structure and adapted for releasably latching said pressure roller support structure when raised to said elevated position;

(e) means for notching said material after a desired number of uniform units of length have been drawn through said rollers to indicate the length so drawn, comprising:
  (i) a fixed blade positioned below the plane of the material being measured and proximate said throat;
  (ii) a movable shear blade adapted for movement in a vertical plane and cooperable for notching said material on the margin thereof;
  (iii) manual notch operator means for moving said movable blade downwardly to notch said fabric; and
  (iv) means biasing said movable blade and manual latch operator means to a raised position wherein said movable blade is out of engagement with said fixed blade;

(f) a mechanical lock-out mechanism operable in response to operation of said notch operator means during notching of said fabric and including:
  (i) disable means for blocking notching motion of said notch operator means and movable between disable and enable positions;
  (ii) rotative means driven by said measuring roller and adapted for being locked in a single rotative home position corresponding to said measuring roller being in a position corresponding to some predetermined uniform unit of measure whereby to lock said measuring roller in such home position; and
  (iii) cooperatively associated positionable members mounted on said base structure and being adapted in response to movement of said notch operator means for mechanically sensing said home position and dependent upon said rotative means being in said home position for locking said rotative means and thereby locking said measuring roller in said home position, moving said disable means to its said enable position enabling said notch operator means to move through the notching motion and raising said pressure roller to its said elevated position for latching by said latching means;

(g) manual latch operator release means adapted to unlatch said pressure roller support structure latching means to allow said pressure roller to return to said lowered position;

(h) manual operator reset means including means operative on said measuring roller rotative means for restoring said rotative means and thereby restoring said measuring roller to said home position when rotatively offset therefrom; and (i) processor means mounted on said base structure including:
  (i) optical encoder and electronic signal processing means operable in response to rotation of said measuring roller for each predetermined unit of measure for developing and storing a signal count corresponding to the total of such units measured and from such count developing and displaying with electronic digital light display means controlled by said count the length so measured;
  (ii) a keyboard and storage means for entering and storing unit price, operator and product code information and displaying with electronic digital alpha-numeric light display means associated therewith the entry of such information;
  (iii) computation means for utilizing said count and unit price and developing therefrom, storing and displaying a total price; and
  (iv) a ticket printer having character forming and ticket advancing means under program control included in said processor means for printing said unit price, length, total price, operator and product code on a ticket in alpha-numeric form; and (j) a switch adapted to disable said optional encoder means in response to raising of said pressure roller to said elevated position.

2. An apparatus as claimed in claim 1 wherein said base structure mounts a housing having a horizontal top wall, opposed vertical sidewalls, a vertical front wall above said throat and a vertical rear wall, said keyboard being mounted in said top wall, said displays including a customer display on said front wall and an operator display on said top wall and wherein said manual notch operator means includes an operator handle adjacent one side wall, said manual latch operator release means includes an operator handle adjacent an opposite sidewall and said manual operator reset means includes an operator handle adjacent said rear wall.

3. An apparatus as claimed in claim 1 wherein said processor means includes in association with said light display means both visual and audible cue signaling means operable under program control in coincidence with selected operations of said keyboard and positioning of said measuring roller.

4. An apparatus as claimed in claim 1 wherein said processor means includes additional manual switch means for selective entry of additional option data to be stored.

5. An apparatus as claimed in claim 1 wherein said processor means includes means under processor control for transmitting selected items of information to an external central computer.

6. An apparatus as claimed in claim 1 wherein said processor means includes means for storing both length and price information related to a measured length of material by unit length and thereafter as a remnant length is pulled through said throat computing and storing an additional count length and price for the remnant length and displaying and printing on said ticket under program control selected remnant related information.

7. Apparatus for measuring and displaying the length and cost of a measured length of material such as fabric, or the like, comprising:
  (a) a measuring roller supported for rotation;
  (b) signal generating means operatively connected to said roller for generating signals coinciding with commencement of rotation of said roller from a position within a predetermined angular increment and in a first direction, commencement of rotation of said roller from a position within said angular increment but in an opposite direction and when said roller is positioned within said angular increment without having commenced rotation in either direction;
  (c) signal processing means responsive to said signals and adapted to process and develop from said signals a count which increases by one each time said roller has completed a revolution in said first direction, decreases by one each time said roller completes a revolution in said opposite direction and is non-responsive to said signals when a signal indicating commencement of rotation in one direction is immediately followed by a signal indicating commencement of rotation in another direction;

(d) storage and computation means including a keyboard for entering unit price data therein and being adapted to receive and read said count and price data and develop therefrom additional signals representative of a length corresponding to said count and a price corresponding to the product of said unit price and length;

(e) display means responsive to said additional signals for digitally displaying the cost and measure length of said material; and (f) printer means having alpha-numeric character forming and ticket strip advancing means and processor control means associated therewith for receiving and printing out said cost and length information in response to said additional signals.

8. An apparatus as claimed in claim 7 including manual switch and storage means for entering and storing data in addition to that entered and stored through said keyboard.

9. An apparatus as claimed in claim 7 wherein said manual switch and storage means are adapted to enter and store additional information data and said printer means is adapted to print out selected said additional information data.

10. An apparatus as claimed in claim 7 wherein said storage and computation means adapt said keyoard to enter and cause a remnant sale selection to be stored, an already accumulated unit length count and corresponding computed total price to be stored, said light displays reset to zero and thereafter as a remnant length is measured and such measuring completed to calculate and display both remnant length and price and then utilizing said printer means to print out both length and price information related to the measured unit lengths and measured remnant length.

11. An apparatus for measuring and displaying the length and cost of a material such as fabric or the like, comprising:

(a) a base structure having a horizontal throat for passage therethrough of a margin of the material to be measured and below said throat a measuring roller adapted for rotation;

(b) pressure means for maintaining said margin of said material resiliently engaged with said roller while being drawn thereon to rotate said roller during measuring of said material;

(c) means for marking said material after a predetermined length thereof has been drawn over said roller through said throat to indicate the length so drawn and during said marking to disengage said pressure means;

(d) optical encoder signal generating means, comprising:

(i) a rotatable assembly coupled for rotation in response to rotation of said roller;

(ii) means for locking said rotatable assembly and thereby locking said pressure roller in a fixed position treated as a home position;

(iii) manual operator means operative on said rotatable assembly when not in said home position for bringing said rotatable assembly and thereby bringing said roller to said home position; and (iv) a pair of light sources and light detectors arranged substantially 180° apart and in relation to a shielding portion of said rotative assembly for generating signals conciding with commencement of rotation of said roller from a position within a predetermined angular increment from said home position and in a first direction, commencement of rotation of said roller from a position within said angular increment but in an opposite direction and when said roller is positioned within said angular increment without having commenced rotation in either direction;

(e) signal processing means responsive to said signals and adapted to process and develop from said signals a count which increases by one each time said roller has completed a revolution in said first direction, decreases by one each time said roller completes a revolution in said opposite direction and is non-responsive to said signals when a signal indicating commencement of rotation in one direction is immediately followed by a signal indicating commencement of rotation in another direction;

(f) storage and computation means including a keyboard for entering unit price data therein and being adapted to receive and read said count and price data and develop therefrom additional signals representative of a length corresponding to said count and a price corresponding to the product of said unit price and length;

(g) display means responsive to said additional signals for digitally displaying the cost and measured length of said material; and (h) printer means having alpha-numeric character forming and ticket strip advancing means and processor control means associated therewith for receiving and printing out said cost and length information in response to said additional signals.

12. An apparatus as claimed in claim 11 wherein said rotatable assembly includes a rotatable member having on one side a double sloped cam engageable by said manual operator means for restoring said rotatable assembly to said home position and on an opposite side having said shielding portion formed as a band for obscuring the light paths associated with said sources at substantially 180° intervals of rotation of said band.

13. An apparatus as claimed in claim 11 wherein said pressure means comprises a pressure roller and including means to raise and lower and latch said pressure roller in a raised position.

14. An apparatus as claimed in claim 13 including a switch adapted to disable said light sources in response to raising of said pressure roller.

* * * * *